US010518846B2

(12) United States Patent
Dagher et al.

(10) Patent No.: US 10,518,846 B2
(45) Date of Patent: Dec. 31, 2019

(54) METHOD OF MOORING FLOATING WIND TURBINE PLATFORMS

(71) Applicant: University of Maine System Board of Trustees, Orono, ME (US)

(72) Inventors: Habib J. Dagher, Veazie, ME (US); Anthony M. Viselli, Bangor, ME (US); John E. Halkyard, Houston, TX (US)

(73) Assignee: University of Maine System Board of Trustees, Orono, ME (US)

( * ) Notice: Subject to any disclaimer, the term of this patent is extended or adjusted under 35 U.S.C. 154(b) by 468 days.

(21) Appl. No.: 15/116,620

(22) PCT Filed: Feb. 6, 2015

(86) PCT No.: PCT/US2015/014752
§ 371 (c)(1),
(2) Date: Aug. 4, 2016

(87) PCT Pub. No.: WO2015/120229
PCT Pub. Date: Aug. 13, 2015

(65) Prior Publication Data
US 2016/0341182 A1 Nov. 24, 2016

Related U.S. Application Data

(60) Provisional application No. 61/936,596, filed on Feb. 6, 2014.

(51) Int. Cl.
*B63B 9/06* (2006.01)
*F03D 13/25* (2016.01)
(Continued)

(52) U.S. Cl.
CPC .............. *B63B 9/065* (2013.01); *B63B 1/107* (2013.01); *B63B 5/18* (2013.01); *B63B 21/20* (2013.01);
(Continued)

(58) Field of Classification Search
CPC .......... F03D 13/10; F03D 13/20; F03D 13/25; F05B 2240/95; F05B 2240/96; B63B 2021/003; B63B 2021/203
See application file for complete search history.

(56) References Cited

U.S. PATENT DOCUMENTS 5,690,047 A * 11/1997 Holmes ................... B63B 21/22
114/294
7,293,960 B2 * 11/2007 Yamamoto ................ F03D 1/02
416/85
(Continued)

FOREIGN PATENT DOCUMENTS

| CN | 101415939 A | 4/2009 |
|---|---|---|
| CN | 102015435 A | 4/2011 |

(Continued)

OTHER PUBLICATIONS

First Chinese Office Action, Application No. 201580007382.3, dated Nov. 1, 2017.
(Continued)

*Primary Examiner* — Brian P Wolcott
(74) *Attorney, Agent, or Firm* — MacMillan, Sobanski & Todd, LLC

(57) ABSTRACT

A floating wind turbine farm 230 includes a plurality of anchors 20/202/204/206/208 fixed in or on a bed of a body of water. A plurality of floating wind turbine platforms 10 is deployed in the body of water, each of the floating wind turbine platforms 10 having one or more mooring lines 200/212 that extend between, and are attached to, the floating wind turbine platform 10 and one of the anchors 20/202/204/206/208. Each anchor 20/202/204/206/208 is configured to receive two or more mooring lines 200/212, wherein each of the mooring lines 200/212 are from a different one of the plurality of floating wind turbine platforms 10.

19 Claims, 19 Drawing Sheets

(51) Int. Cl.
*B63B 1/10* (2006.01)
*F03D 13/10* (2016.01)
*B63B 5/18* (2006.01)
*B63B 21/20* (2006.01)
*B63B 21/50* (2006.01)
*F03D 1/06* (2006.01)
*F03D 3/00* (2006.01)
*B21D 47/00* (2006.01)
*B63B 35/44* (2006.01)

(52) U.S. Cl.
CPC ............. *B63B 21/502* (2013.01); *F03D 1/06* (2013.01); *F03D 3/005* (2013.01); *F03D 13/10* (2016.05); *F03D 13/25* (2016.05); *B21D 47/00* (2013.01); *B63B 2009/067* (2013.01); *B63B 2021/505* (2013.01); *B63B 2035/446* (2013.01); *F05B 2230/60* (2013.01); *F05B 2240/93* (2013.01); *Y02B 10/30* (2013.01); *Y02E 10/721* (2013.01); *Y02E 10/727* (2013.01); *Y02P 70/523* (2015.11); *Y10T 29/49616* (2015.01)

(56) References Cited

U.S. PATENT DOCUMENTS

| | | | | |
|---|---|---|---|---|
| 8,096,116 | B2* | 1/2012 | Draper | B63B 21/50 60/398 |
| 8,217,526 | B2* | 7/2012 | Devitt | C23C 4/04 290/55 |
| 9,446,822 | B2 | 9/2016 | Roddier et al. | |
| 9,518,564 | B2 | 12/2016 | Dagher et al. | |
| 2005/0109256 | A1* | 5/2005 | Zaman | B63B 21/50 114/230.23 |
| 2006/0165493 | A1* | 7/2006 | Nim | B63B 35/44 405/223.1 |
| 2011/0148115 | A1 | 6/2011 | Roznitsky et al. | |
| 2011/0155038 | A1* | 6/2011 | Jahnig | B63B 1/107 114/264 |
| 2011/0214596 | A1 | 9/2011 | Wang | |
| 2012/0103244 | A1* | 5/2012 | Gong | B63B 21/50 114/265 |
| 2013/0224020 | A1 | 8/2013 | Dagher et al. | |
| 2013/0233231 | A1 | 9/2013 | Dagher et al. | |
| 2013/0276687 | A1 | 10/2013 | Roddier et al. | |

FOREIGN PATENT DOCUMENTS

| | | | |
|---|---|---|---|
| CN | 103282274 A | 9/2013 | |
| DE | 102012007613 A1 | 10/2013 | |
| JP | S559757 U | 1/1980 | |
| JP | S57137166 U | 8/1982 | |
| WO | 0210589 A1 | 2/2002 | |
| WO | 02087959 A2 | 11/2002 | |
| WO | 2007096121 A1 | 8/2007 | |
| WO | 2010019050 A1 | 2/2010 | |
| WO | 2012/061710 A2 | 5/2012 | |
| WO | 2012061710 A2 | 5/2012 | |
| WO | WO 2012061710 A2 * | 5/2012 | ............... B63B 5/14 |
| WO | 2012123209 A1 | 9/2012 | |
| WO | WO-2012123209 A1 * | 9/2012 | ............ B63B 21/50 |
| WO | 2013027036 A1 | 2/2013 | |
| WO | 2013045465 A1 | 4/2013 | |
| WO | 2013084545 A1 | 6/2013 | |
| WO | 2015/120227 A1 | 8/2015 | |

OTHER PUBLICATIONS

Extended European Search Report, Application No. 15746266.4, dated Nov. 3, 2017.
PCT International Search Report and Written Opinion, Application No. PCT/US15/14752, dated Apr. 28, 2015.
Japanese Office Action, Application No. 2016-550171, dated Nov. 27, 2018.

* cited by examiner

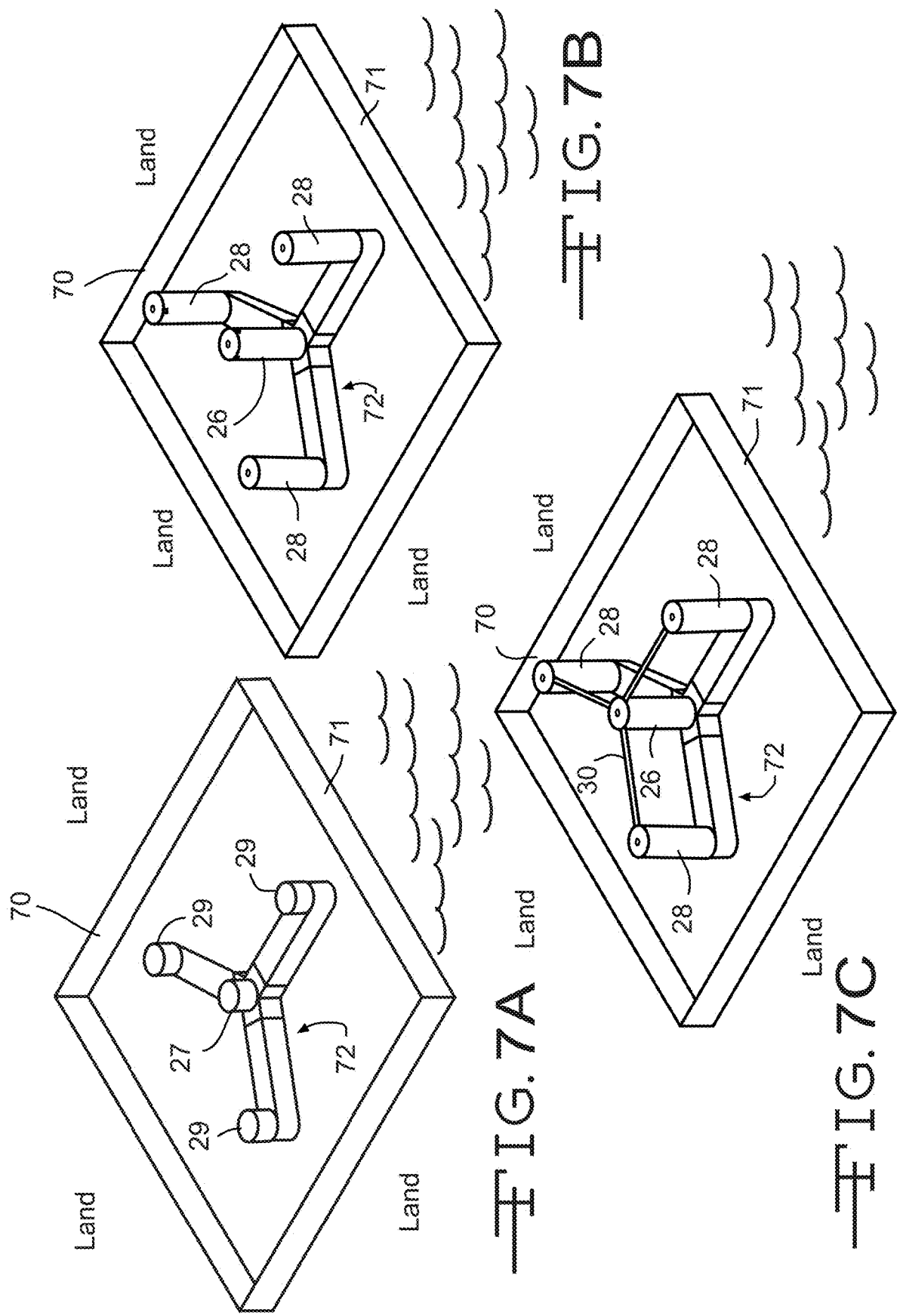

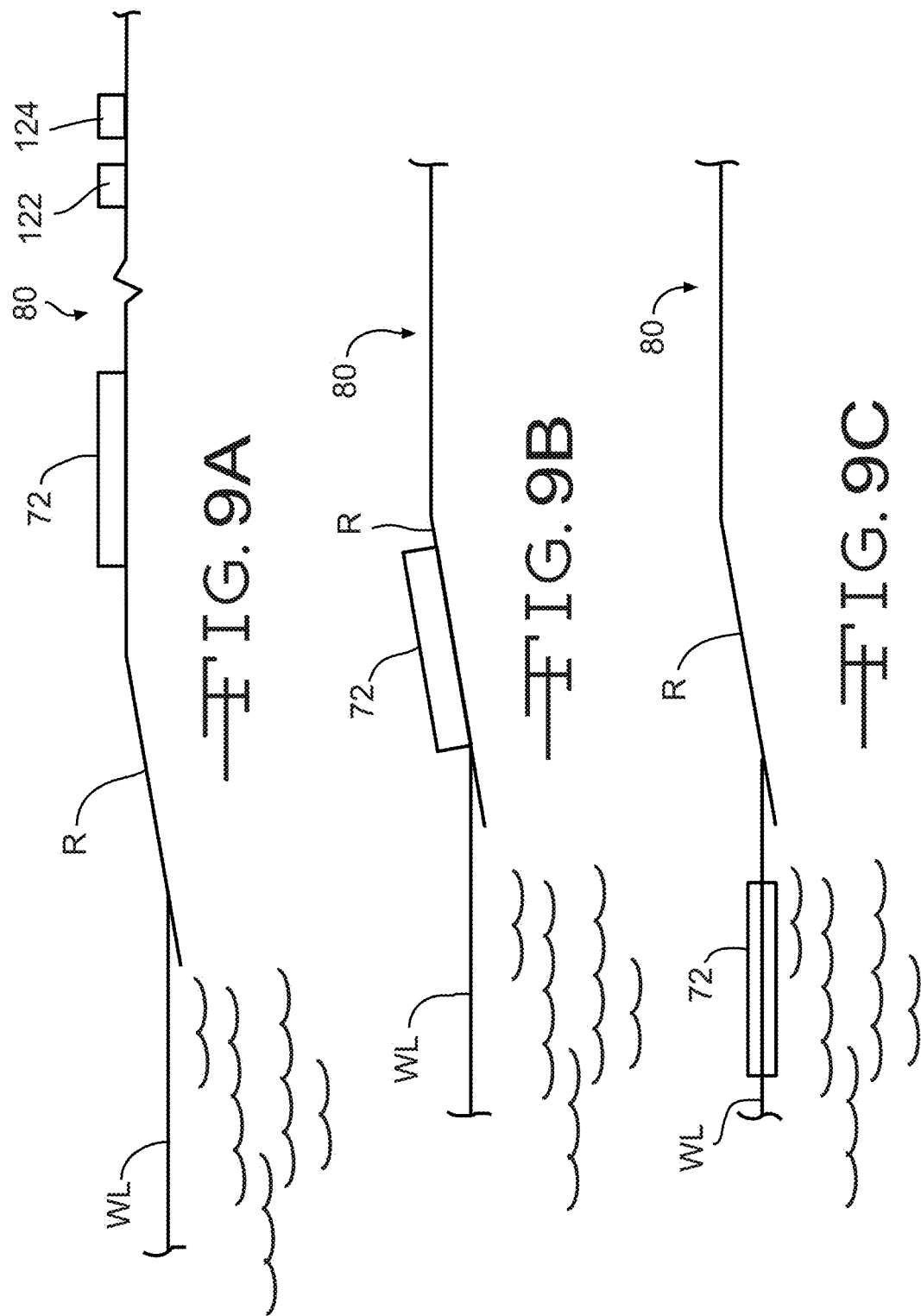

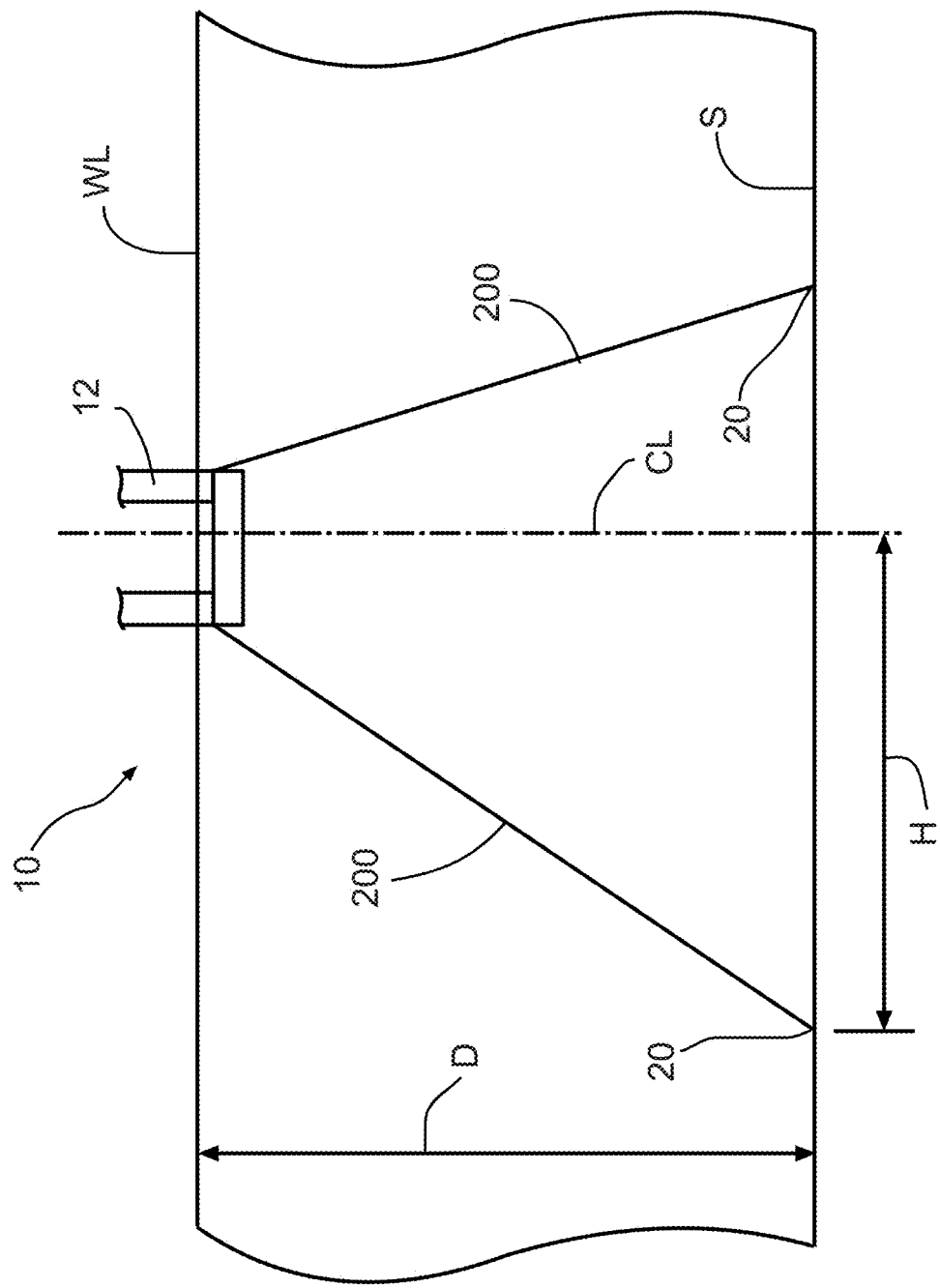

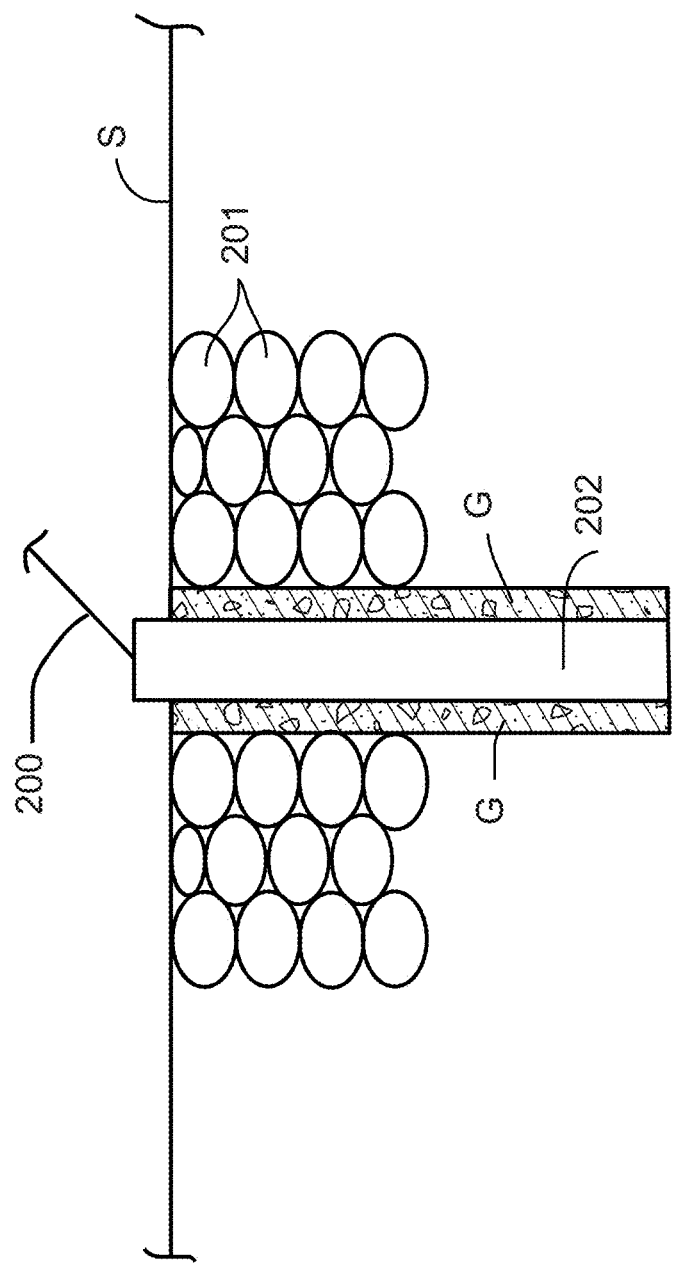

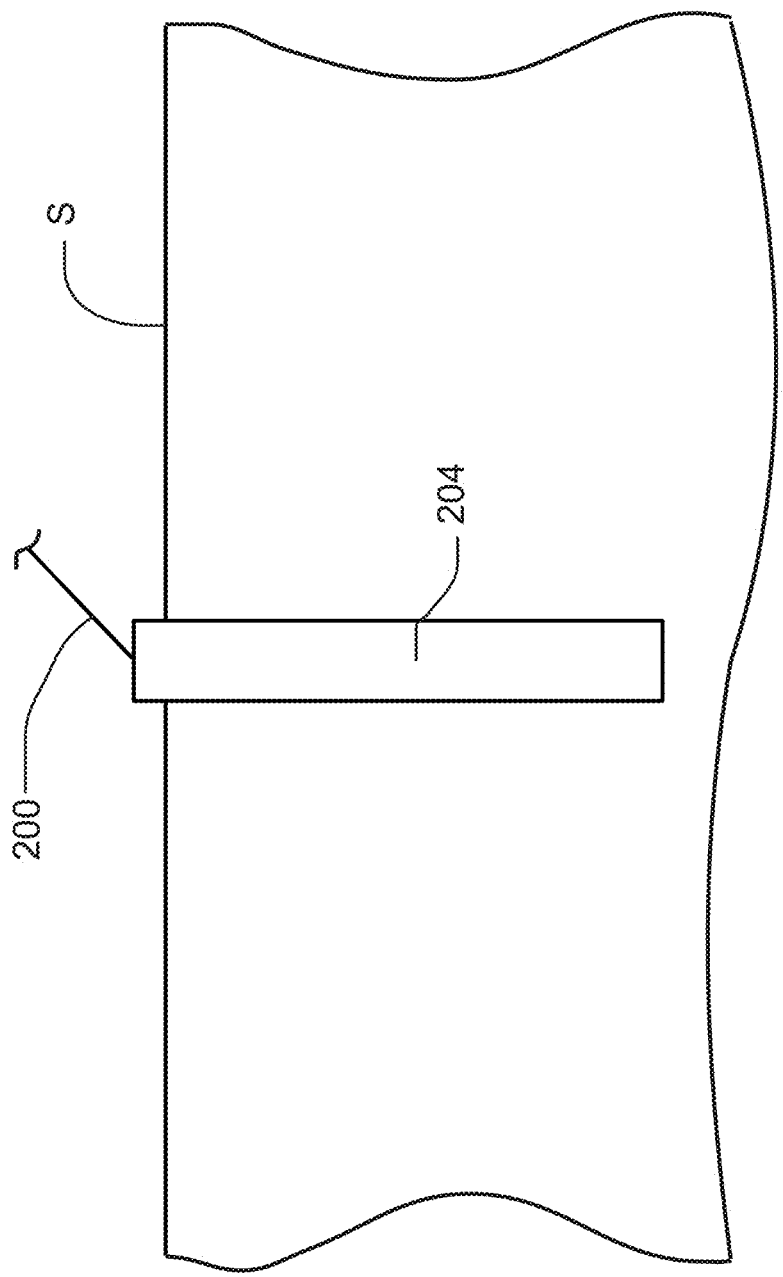

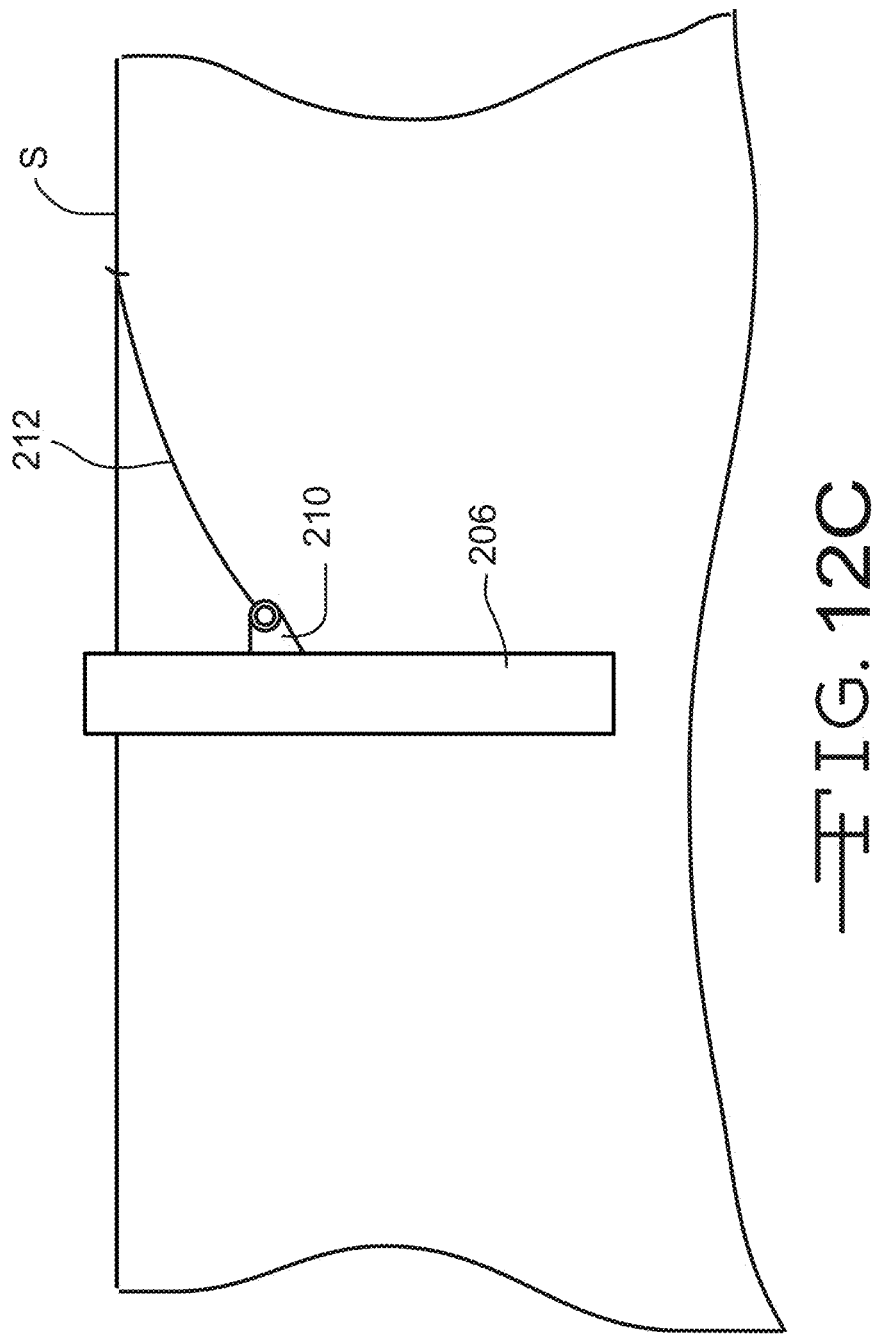

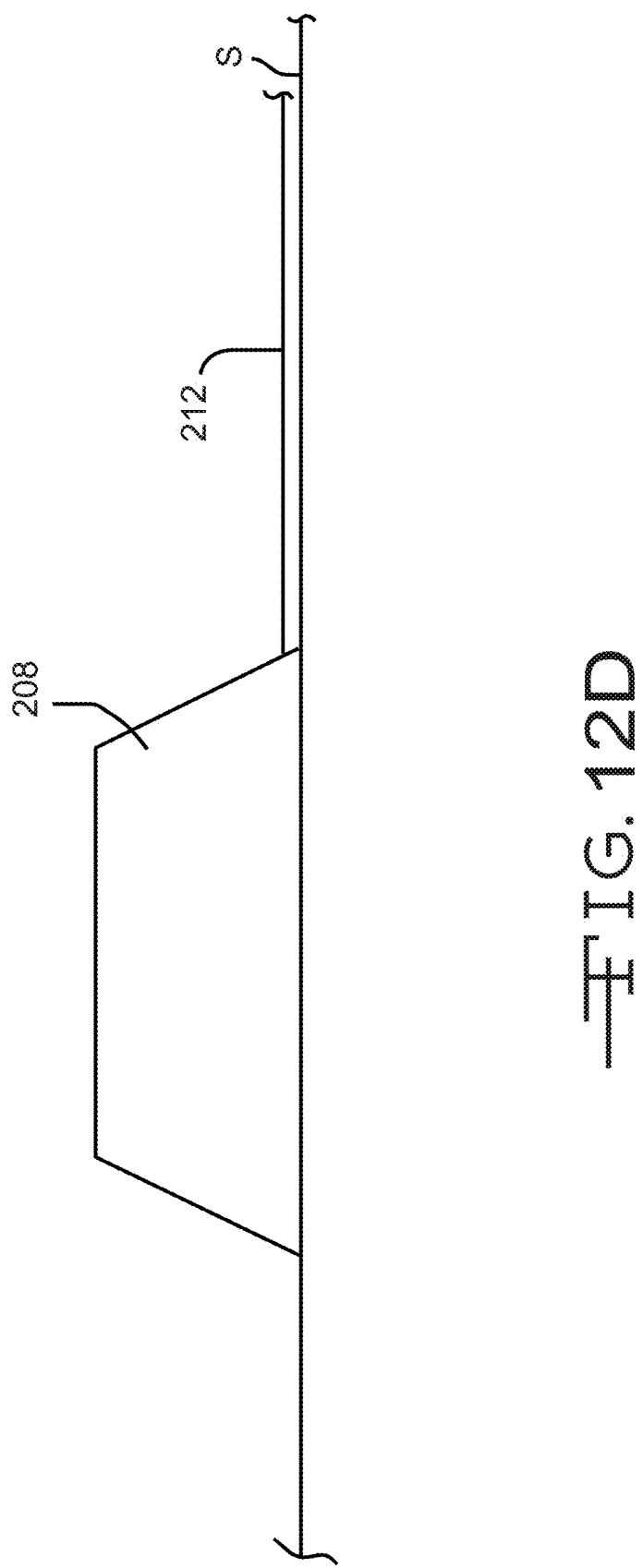

US 10,518,846 B2

METHOD OF MOORING FLOATING WIND TURBINE PLATFORMS

BACKGROUND OF THE INVENTION

This invention relates in general to wind turbine platforms. In particular, this invention relates to an improved method of assembling a floating wind turbine platform and an improved method for mooring such a floating wind turbine platform.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations is relatively expensive, and can only be accomplished at relatively shallow depths, such as a depth of up to about 25 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore where the water is over 60 meters deep. Fixed foundations for wind turbines in such deep water are not likely economically feasible. This limitation has led to the development of floating platforms for wind turbines.

Known floating wind turbine platforms are formed from steel and are based on technology developed by the offshore oil and gas industry. Other examples of floating wind turbine platform are described in PCT Application No. PCT/US2011/059335, filed Nov. 4, 2011 (published as PCT Publication No. WO2012061710 A2 on May 10, 2012), U.S. patent application Ser. No. 13/863,074, filed Apr. 15, 2013 (published as U.S. Patent Application Publication No. 2013/0233231 A1 on Sep. 12, 2013), and PCT Application No. PCT/US2014/057236, filed Sep. 24, 2014 (published as PCT Publication No. WO2012061710 A2 on May 10, 2012), the disclosures of which are incorporated herein by reference. There remains however, a need to provide improved methods of assembling and mooring a floating wind turbine platform.

SUMMARY OF THE INVENTION

This invention relates to an improved method for mooring one or more floating wind turbine platforms. In one embodiment, a floating wind turbine farm includes a plurality of anchors fixed in or on a bed of a body of water. A plurality of floating wind turbine platforms is deployed in the body of water, each of the floating wind turbine platforms having one or more mooring lines that extend between, and are attached to, the floating wind turbine platform and one of the anchors. Each anchor is configured to receive two or more mooring lines, wherein each of the mooring lines are from a different one of the plurality of floating wind turbine platforms.

Other advantages of the invention will become apparent to those skilled in the art from the following detailed description, when read in view of the accompanying drawings.

BRIEF DESCRIPTION OF THE DRAWINGS

FIG. 7A is a perspective view showing the base assembly formed in a graving dock in accordance with a third embodiment of the improved method of assembling a floating wind turbine platform and showing the center and the outer columns partially formed.

FIG. 7B is a perspective view of the base assembly illustrated in FIG. 7A showing the center and the outer columns fully formed.

FIG. 7C is a perspective view of the base assembly illustrated in FIG. 7B showing the top members installed and defining the foundation of the floating wind turbine platform.

FIG. 9A is an elevational view of the base assembly shown during first step of a fifth embodiment of the improved method of assembling a floating wind turbine platform.

FIG. 9B is an elevational view of the base assembly illustrated in FIG. 9A during a second step of the fifth embodiment of the improved method of assembling a floating wind turbine platform.

FIG. 9C is an elevational view of the base assembly illustrated in FIGS. 9A and 9B during a third step of the fifth embodiment of the improved method of assembling a floating wind turbine platform.

FIG. 11 is an elevational view of a portion of the floating wind turbine platform illustrated in FIGS. 1-3 showing a first embodiment of a method of mooring the floating wind turbine platform.

FIG. 12A is an elevational view of a first embodiment of an anchor used for mooring the floating wind turbine platform illustrated in FIGS. 1-3.

FIG. 12 B is an elevational view of a second embodiment of an anchor used for mooring the floating wind turbine platform illustrated in FIGS. 1-3.

FIG. 12 C is an elevational view of a third embodiment of an anchor used for mooring the floating wind turbine platform illustrated in FIGS. 1-3.

FIG. 12D is an elevational view of a fourth embodiment of an anchor used for mooring the floating wind turbine platform illustrated in FIGS. 1-3.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figures 1, 1A:
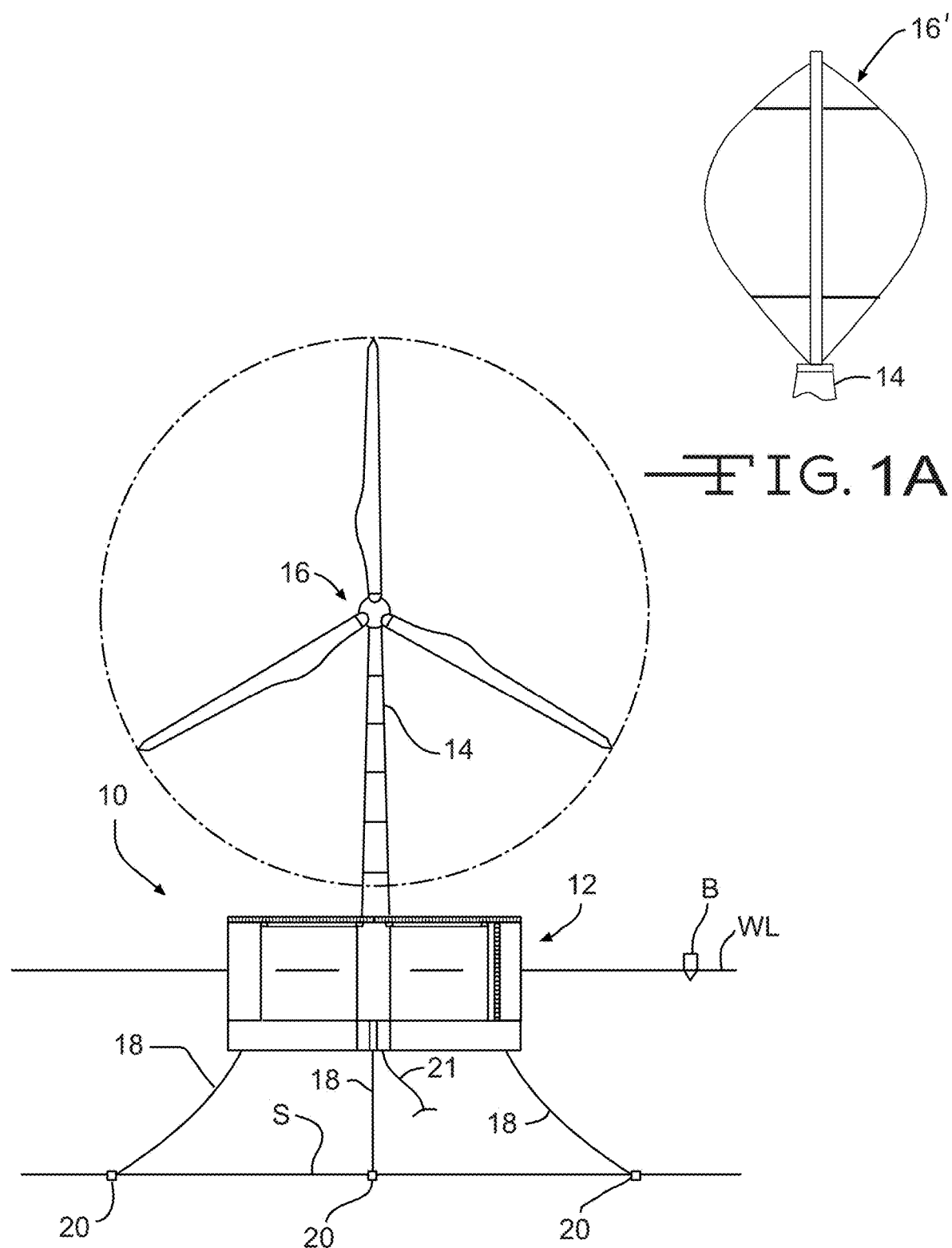
FIG. 1 is an elevational view of an improved floating wind turbine platform according to this invention.
FIG. 1A is an enlarged elevational view of portion of an alternate embodiment of the floating wind turbine platform illustrated in FIG. 1, showing a vertical-axis wind turbine.

Referring to the drawings, particularly to FIG. 1, a first embodiment of a floating wind turbine support system or platform 10 is shown anchored to a bed of a body of water.

In the illustrated embodiment, the floating wind turbine support platform 10 is shown anchored to the seabed S. It will be understood that the bed may be the bed of any body of water in which the floating wind turbine support platform 10 will be placed into operation. The illustrated floating wind turbine platform 10 includes a foundation 12 that supports a tower 14, described below in detail. The tower 14 supports a wind turbine 16. The foundation is semi-submersible, and is structured and configured to float, semi-submerged, in a body of water. Accordingly, a portion of the foundation 12 will be above water when the foundation 12 is floating in the water. As shown, a portion of the foundation 12 is below the waterline WL. As used herein, the waterline is defined as the approximate line where the surface of the water meets the floating wind turbine platform 10. Mooring lines 18 may be attached to the floating wind turbine platform 10 and further attached to anchors, such as the anchors 20 in the seabed S to limit to movement of the floating wind turbine platform 10 on the body of water.

Figure 2:
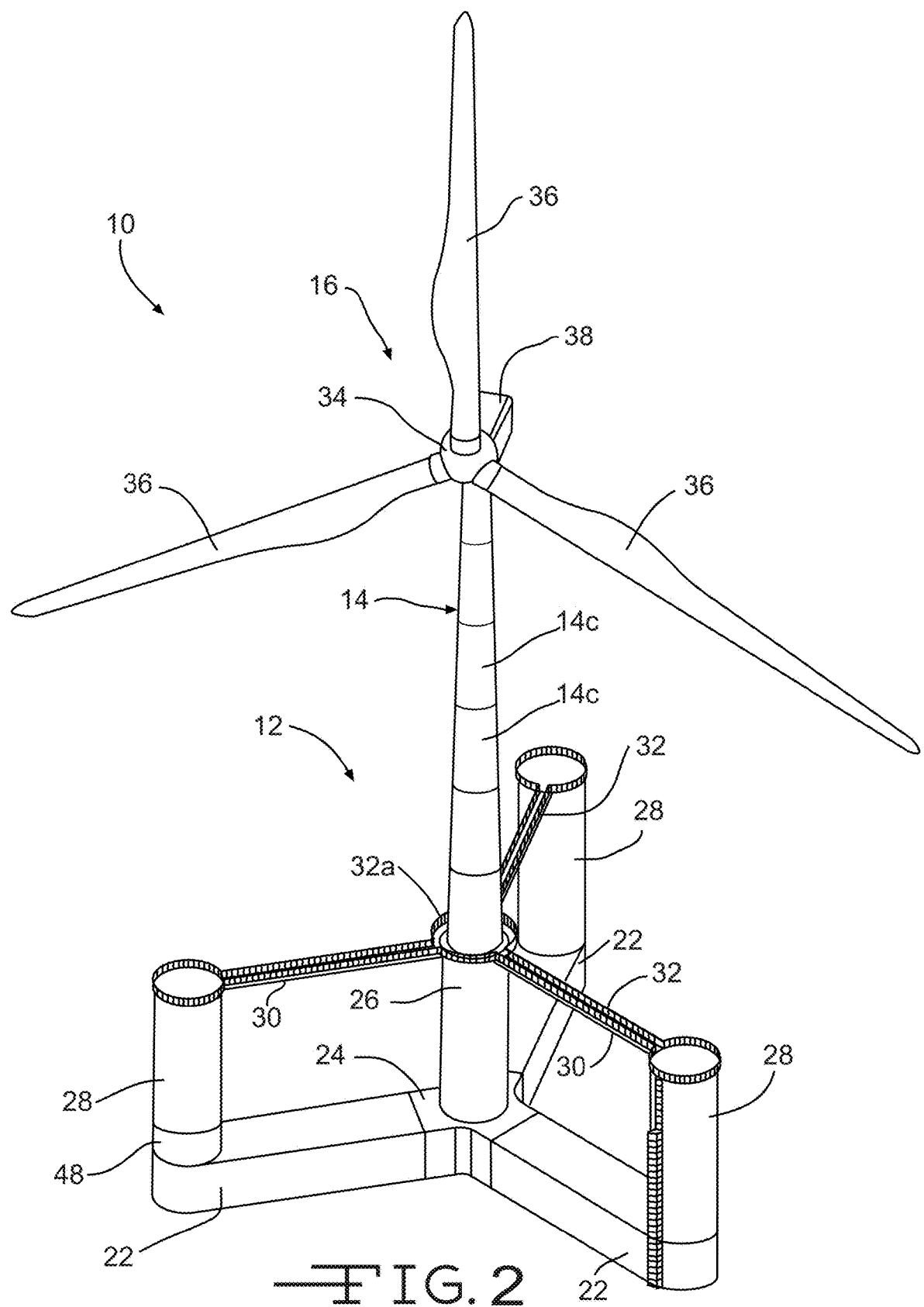
FIG. 2 is a perspective view of the improved floating wind turbine platform illustrated in FIG. 1.

As will be described in greater detail below, and best shown in FIG. 2, the illustrated foundation 12 is formed from three bottom beams 22 that extend radially outwardly from a keystone 24 and provide buoyancy. An interior or center column 26 is mounted to the keystone 24, and three outer columns 28 are mounted at or near the distal ends of the bottom beams 22. The center column 26 and outer columns 28 extend upwardly and perpendicularly to the bottom beams 22 and also provide buoyancy. Additionally, the center column 26 supports the tower 14. Radial support beams or top members 30 are connected to the center column 26 and each of the outer columns 28. The tower 14 is mounted to the center column 26. If desired, access-ways or catwalks 32 may be attached to each top member 30. Each catwalk 32 may be connected by a connecting catwalk 32a mounted around all or a portion of a base of the tower 14.

In the embodiments illustrated herein, the wind turbine 16 is a horizontal-axis wind turbine. Alternatively, the wind turbine may be a vertical-axis wind turbine, such as shown at 16' in FIG. 1A. The size of the turbine 16 will vary based on the wind conditions at the location where the floating wind turbine platform 10 is anchored and the desired power output. For example, the turbine 16 may have an output of about 5 MW. Alternatively, the turbine 16 may have an output within the range of from about 1 MW to about 10 MW.

The wind turbine 16 includes a rotatable hub 34. At least one rotor blade 36 is coupled to and extends outward from the hub 34. The hub 34 is rotatably coupled to an electric generator (not shown). The electric generator may be coupled via a transformer (not shown) and an underwater power cable 21, as shown in FIG. 1, to a power grid (not shown). In the illustrated embodiment, the rotor has three rotor blades 36. In other embodiments, the rotor may have more or less than three rotor blades 36. A nacelle 37 is attached to the wind turbine 16 opposite the hub 34.

Figure 3:
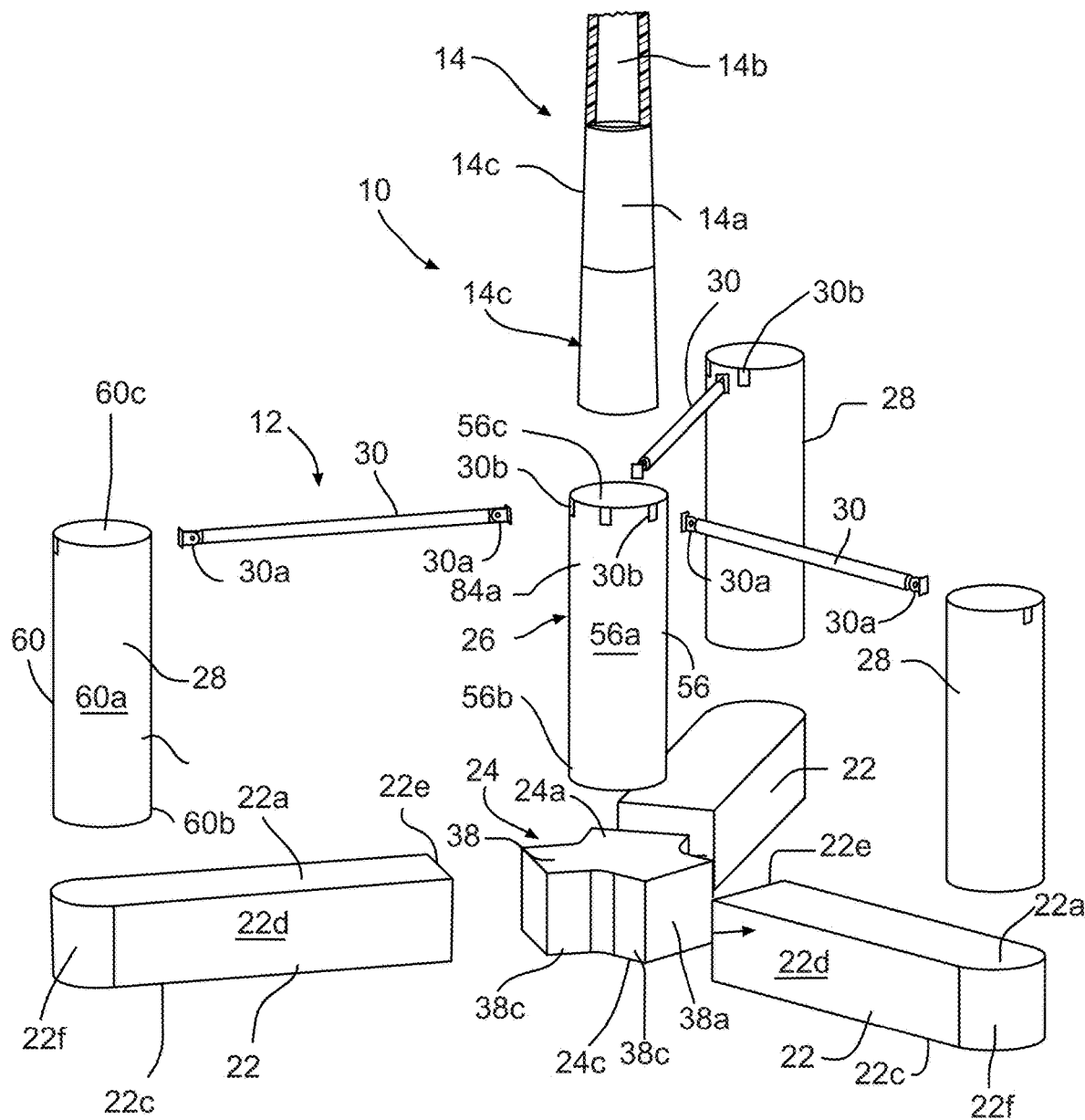
FIG. 3 is an exploded perspective view of the improved floating wind turbine platform illustrated in FIGS. 1 and 2.

As shown in FIG. 3, the keystone 24 includes an upper wall 24a, a lower wall 24c, and three radially outwardly extending legs 38. Each leg 38 includes an end wall 38a defining a substantially vertical connection face to which the bottom beams 22 will be attached, and opposing side walls 38c.

In the illustrated embodiment, the keystone 24 includes three legs 38. Alternatively, the keystone 24 may include four or more legs for the attachment of four or more bottom beams 22.

The illustrated keystone 24 is formed from pre-stressed reinforced concrete, and may include an internal central cavity (not shown). Each leg 38 may also include an internal leg cavity (not shown). Any desired process may be used to manufacture the keystone 24, such as a spun concrete process or with conventional concrete forms. Alternatively, other processes such as those used in the precast concrete industry may also be used. The concrete of the keystone 24 may be reinforced with any conventional reinforcement material, such as high tensile steel cable and high tensile steel reinforcement bars or REBAR. Alternatively, the keystone 24 may be formed from FRP, steel, or combinations of pre-stressed reinforced concrete, FRP, and steel.

As also shown in FIG. 3, each bottom beam 22 includes an upper wall 22a, a lower wall 22c, opposing side walls 22d, a first end wall 22e, which will be connected to the end wall 38a of the leg 38 of the keystone 24, and a semi-cylindrical second end wall 22f. Like the keystone 24, the illustrated bottom beams 22 are formed from pre-stressed reinforced concrete as described above. Alternatively, the bottom beams 22 may be formed from FRP, steel, or combinations of pre-stressed reinforced concrete, FRP, and steel.

If desired, one or more first ballast chambers (not shown) may be formed in each bottom beam 22. Also, one or more second ballast chambers (not shown) may be formed in each outer column 28.

Referring again to FIG. 3, the center column 26 includes a cylindrical side wall 56 having an outer surface 56a, a first axial end 56b, a second axial end wall 56c, and defines a hollow interior space (not shown). Similarly, the outer columns 28 include a cylindrical side wall 60 having an outer surface 60a, a first axial end 60b, a second axial end wall 60c, and define a hollow interior space (not shown). Like the keystone 24 and the bottom beams 22, the illustrated center column 26 and the outer columns 28 are formed from pre-stressed reinforced concrete as described above. Alternatively, the center column 26 and the outer columns 28 may be formed from FRP, steel, or combinations of pre-stressed reinforced concrete, FRP, and steel. The center column 26 and the outer columns 28 may be formed in sections, as described in detail below.

The illustrated floating wind turbine platform 10 includes three bottom beams 22 and three outer columns 28. It will be understood however, that the improved floating wind turbine platform 10 may be constructed with four or more bottom beams 22 and outer columns 28.

Referring to FIG. 3, the top members 30 are configured as substantially axially loaded members and extend substantially horizontally between upper ends of the center column 26 and each outer column 28. In the illustrated embodiment, the top members 30 are formed of tubular steel having an outside diameter of about 4 ft (1.2 m). Alternatively, the top members 30 may be formed from FRP, pre-stressed reinforced concrete, or combinations of pre-stressed reinforced concrete, FRP, and steel. Each top member 30 includes mounting brackets 30a at each end. The mounting brackets 30a are configured to be attached, such as by threaded fasteners, to attachment members 30b, such as steel plates, on the center column 26 and each outer column 28.

The top members 30 are further designed and configured substantially not to resist the bending moment of the base of the tower 14, and do not carry a bending load. Rather, the top members 30 receive and apply tensile and compressive forces between the center column 26 and the outer columns 28.

The illustrated top members 30, formed of about 4 ft diameter steel, are lighter and thinner than similar beams formed from reinforced concrete. The use of relatively lighter and thinner top members 30; i.e., axially loaded members, at the upper portion of the floating wind turbine platform 10 allows for the distribution of more relative weight at the bottom of the floating wind turbine platform 10 platform structure where it is needed most. The reduction in weight can be significant. For example, a concrete member weighing about 800,000 pounds may be replaced with a steel beam weighing about 70,000 pounds, thus also providing advantageous savings in material and construction cost.

In the illustrated embodiment, the tower 14 is tubular having an outer wall 14a defining a hollow interior space 14b, and may have any suitable outside diameter and height. In the illustrated embodiment, the outside diameter of the tower 14 tapers from a first diameter at its base to a second, smaller diameter at its upper end. The illustrated tower 14 is formed from fiber reinforced polymer (FRP) composite material. Non-limiting examples of other suitable composite materials include glass and carbon FRP. The tower may also be formed from a composite laminate material. Alternatively, the tower 14 may be formed from concrete or steel in the same manner as the components of the foundation 12, described in detail above. The tower 14 may be formed in any number of sections 14c.

Advantageously, the tower 14 formed from composite material as described above will have reduced mass above a waterline WL relative to a conventional steel tower. Because the FRP composite tower 14 has reduced mass, the mass of the foundation 12, including any ballast, required below the water line WL to maintain stability of the floating wind turbine platform 10 may also be reduced. This will reduce the overall cost of the wind generating device.

Referring now to FIGS. 4A through 6D, a first embodiment of a method of assembling a floating wind turbine platform, such as the floating wind turbine platform 10, is shown. As will be described in detail, the first embodiment of the method includes forming or assembling the keystone 24 and the bottom beams 22 to define a base assembly 72 in a shallow graving dock, and forming or assembling the tower 14 and wind turbine 16 on the assembled base assembly 72.

Figures 4A, 4B, 4C:
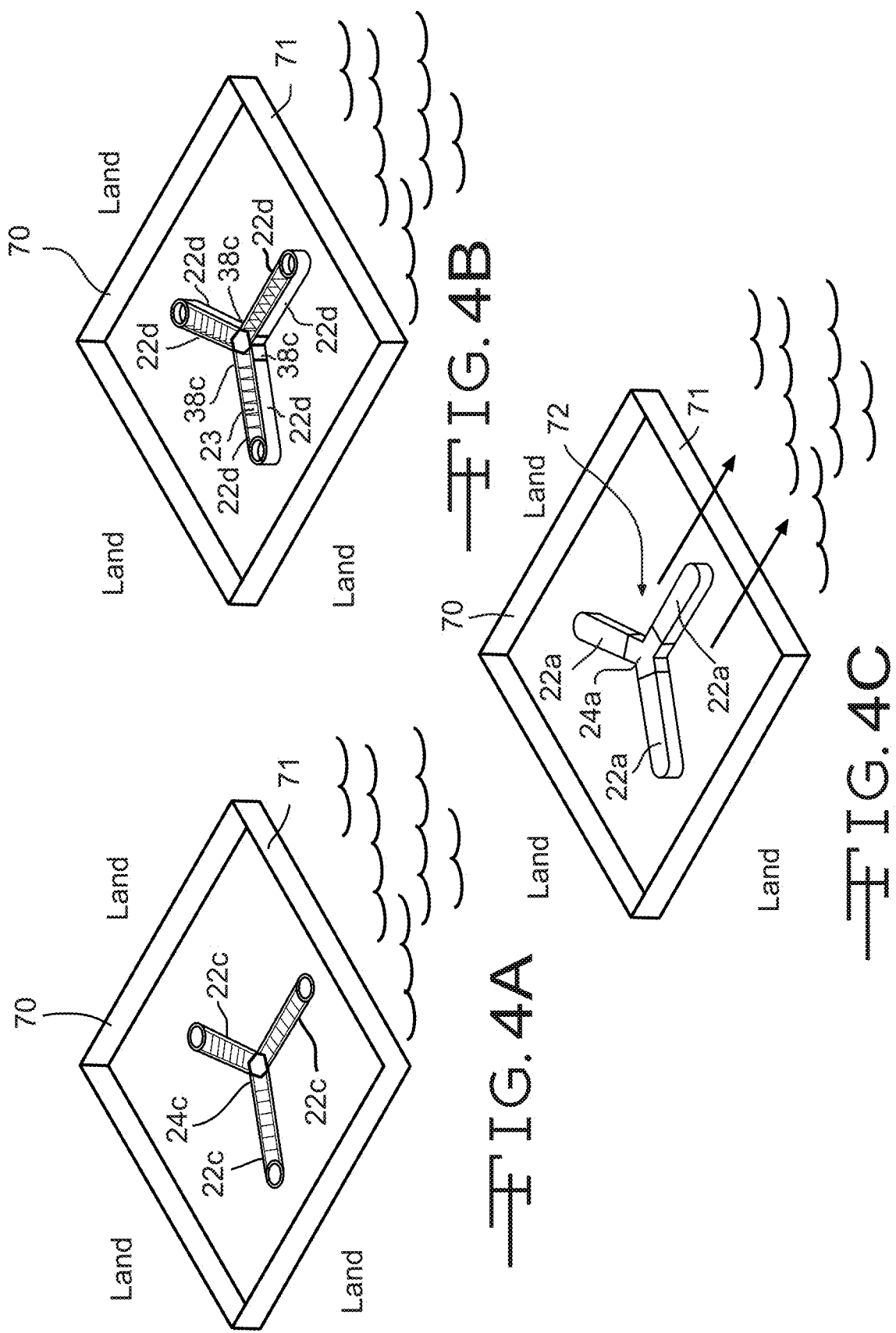
FIG. 4A is a perspective view of a portion of the base assembly illustrated in FIGS. 1-3 formed in accordance with a first embodiment of the improved method of assembling a floating wind turbine platform according to this invention.
FIG. 4B is a perspective view of a portion of the base assembly illustrated in FIG. 4A showing the side walls of the bottom beams and the keystone.
FIG. 4C is a perspective view of a portion of the base assembly illustrated in FIGS. 4A and 4B showing the upper walls of the bottom beams and the keystone.

In a first step of the method, as best shown in FIGS. 4A through 4C, a dry dock, cofferdam, or graving dock 70 is formed. In the embodiment illustrated in FIGS. 4A through 4C, the graving dock 70 is a shallow graving dock. As used herein, a shallow graving dock is a graving dock built in a body of water having a depth of about ten feet. Alternatively, the shallow graving dock 70 may be built in a body of water having any desired depth. The depth of the a body of water in which the shallow graving dock 70 will be built will be a function of the minimum draft required to float the completed base assembly 72 after the graving dock 70 is flooded. The illustrated graving dock 70 has four walls, at least one of which (wall 71 in the figures) is positioned and configured to be opened, such as with a gate (not shown) to the body of water.

The lower wall 24c of the keystone 24 and the lower walls 22c of the bottom beams 22 are then formed within the graving dock 70. The lower walls 24c and 22c may be formed from reinforced concrete that is cast in place using conventional formwork (not shown). The side walls 38c of the legs 38 of the keystone 24 and the side walls 22d of the bottom beam 22 may then be formed, followed by the upper wall 24a of the keystone 24 and the upper walls 22a of the bottom beam 22; each formed in the same manner as the lower walls 24c and 22c.

Once formed and cured, the keystone 24 and the bottom beams 22 may be assembled and post-tensioned longitudinally to define the base assembly 72. The keystone 24 and the bottom beams 22 may be post-tensioned by any desired post-tensioning method, thus applying a compressive force between the keystone 24 and the bottom beams 22. For example, the base assembly 72 may be post-tensioned at least in the longitudinal direction of each bottom beam 22.

Alternatively, the keystone 24 and each bottom beam 22 may be formed from reinforced concrete in a manufacturing step outside the graving dock 70 and moved to the graving dock 70. Once moved within the graving dock 70, the keystone 24 and the bottom beams 22 may be assembled and post-tensioned as described above. It will be understood that the graving dock 70 may be of any desired size, such that two or more base assemblies 72 may be simultaneously formed.

Once the keystone 24 and the bottom beams 22 are assembled and post-tensioned, the graving dock 70 may be flooded and the base assembly 72 floated to an assembly area having a pier or dock 74 and water having a depth of about 30 feet. Alternatively, the assembly area and dock 74 may be located in water having any desired depth. The depth of the water in which the assembly area and dock 74 will be located will be a function of the minimum draft required to float the completed floating wind turbine platform 10.

Figure 5B:
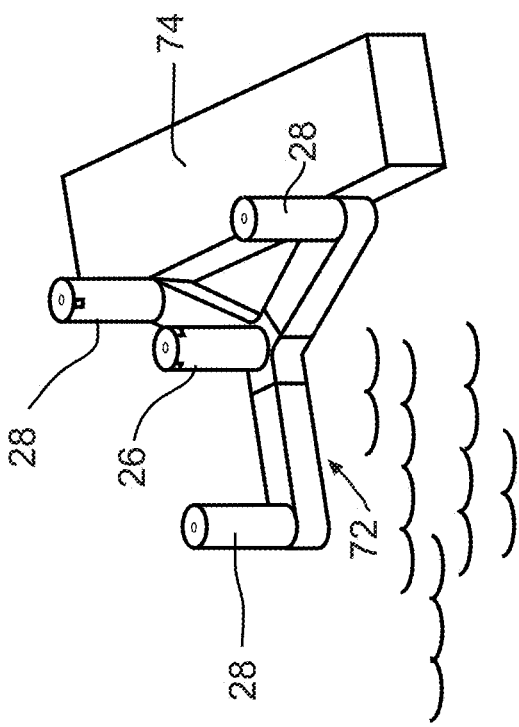
FIG. 5B is a perspective view of the base assembly illustrated in FIG. 5A showing the center and the outer columns fully formed.
Figure 5C:
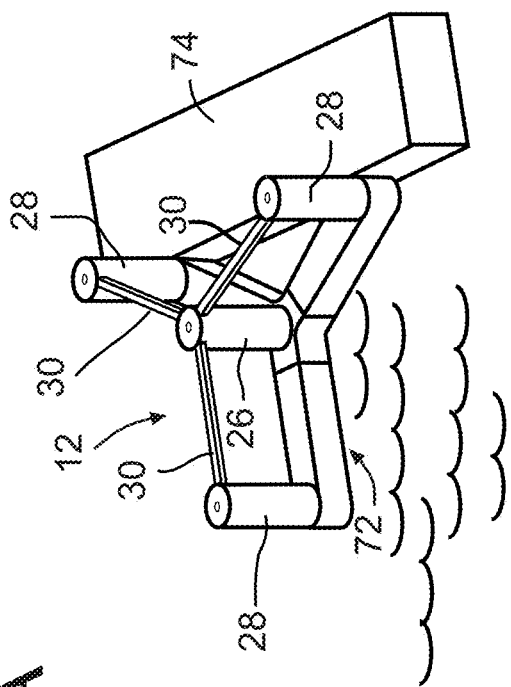
FIG. 5C is a perspective view of the base assembly illustrated in FIG. 5B showing the top beams installed and defining the foundation of the floating wind turbine platform.
Figure 5A:
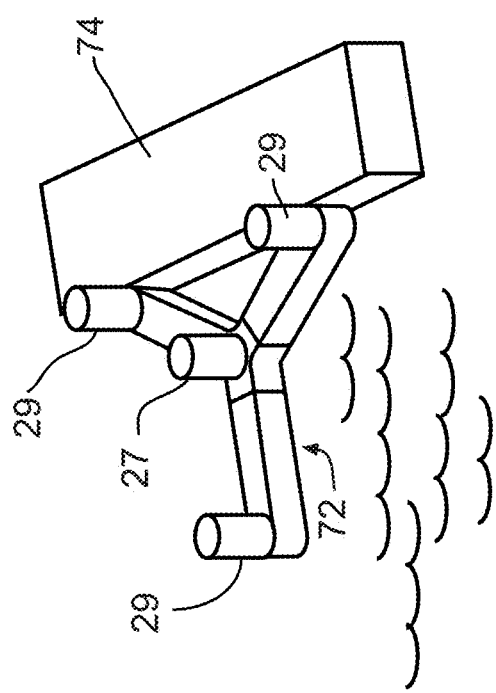
FIG. 5A is a perspective view of the base assembly illustrated in FIG. 4C shown floating adjacent a dock and showing the center and the outer columns partially formed.

With the base assembly 72 floating in the assembly area adjacent the dock 74, as best shown in FIGS. 5A through 5C, the center column 26 and the outer columns 28 may be formed. The center column 26 and the outer columns 28 may be formed by any conventional reinforced concrete forming method, such a by slip forming, or by jump forming. Once formed, the center column 26 and the outer columns 28 may then be post-tensioned as described above.

Alternatively, the center column 26 and the outer columns 28 may be formed in sections 27 and 29, respectively, as shown in FIG. 5A, from reinforced concrete in a manufacturing step outside the graving dock 70 and moved to the graving dock 70. Once moved within the graving dock 70, the sections 29 of the center column 26 and the outer columns 28 may be assembled, such as with a crane (not shown) and post-tensioned as described above. For example, the center column 26 and the outer columns 28 may be post-tensioned along their longitudinal axes onto distal ends of the bottom beams 22. If desired, adhesive may be applied between the sections 27 of the center column 26 and between the sections 29 of each outer column before the center column 26 and the outer columns 28 are post-tensioned together.

Further, as shown in FIG. 5C, after completion and post-tensioning of the center column 26 and the outer columns 28, the top members 30 may be attached between upper ends of the center column 26 and each outer column 28, as described above, thereby defining the foundation 12.

Referring now to FIGS. 6A through 6D, the tower 14 may be formed and the wind turbine 16 installed on the tower 14. The tower 14 may be formed from sections 14c from any desired material as described above, and moved to the foundation 12 at the dock 74. Once moved to the foundation 12 at the dock 74, the sections 14c of the tower 14 may be assembled, such as with a crane (not shown). If desired, the tower 14 may be post-tensioned as described above.

Figure 6B:
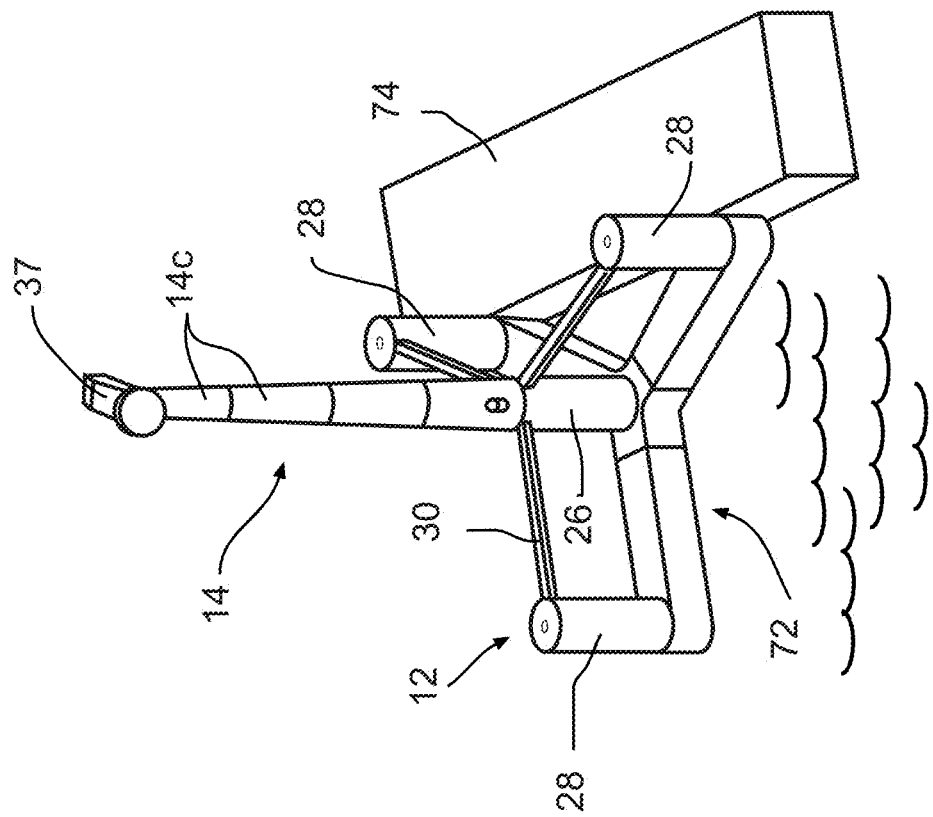
FIG. 6B is a perspective view of the foundation illustrated in FIG. 6A showing the nacelle assembled thereto.
Figure 6A:
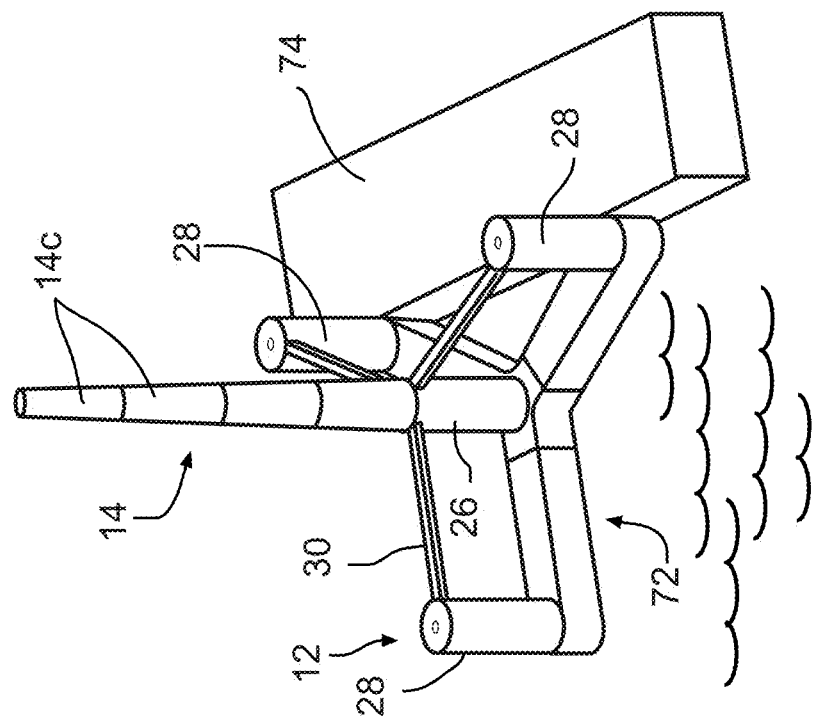
FIG. 6A is a perspective view of the foundation illustrated in FIG. 5C showing the tower fully formed.
Figure 6D:
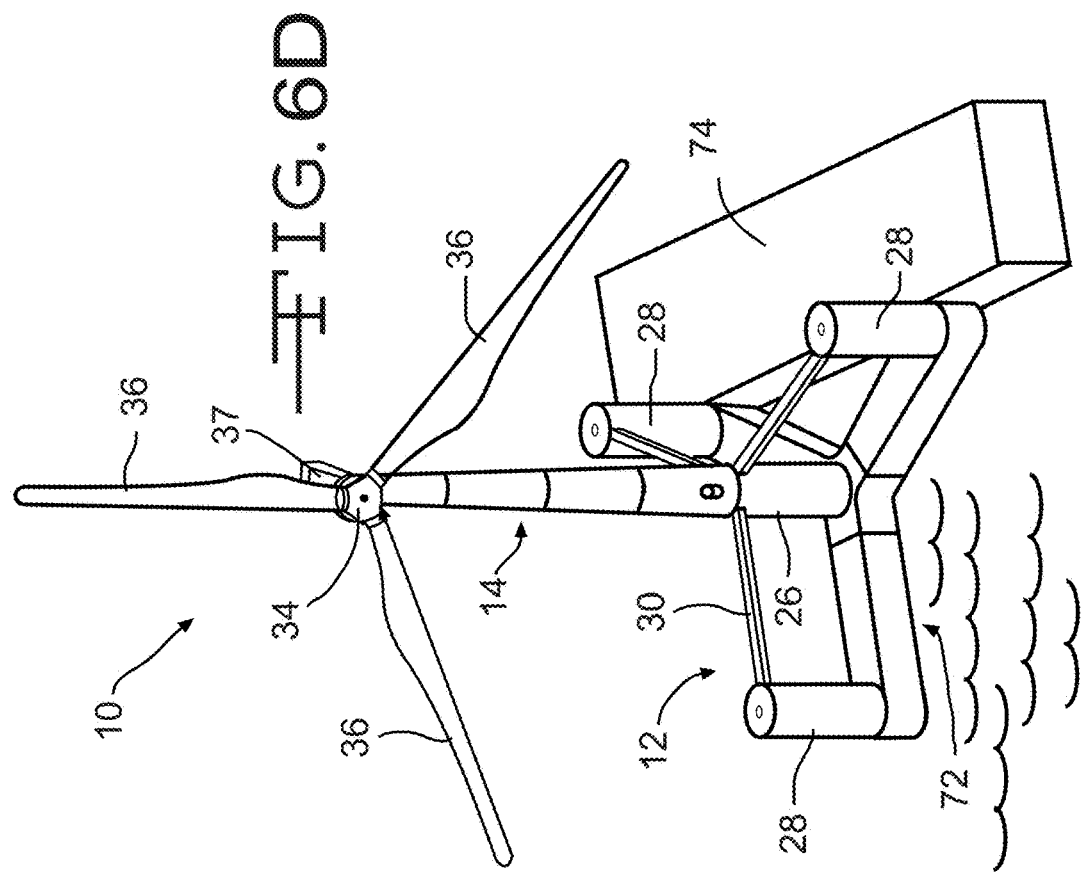
FIG. 6D is a perspective view of the fully assembled floating wind turbine platform, including the foundation and tower illustrated in FIG. 6C.
Figure 6C:
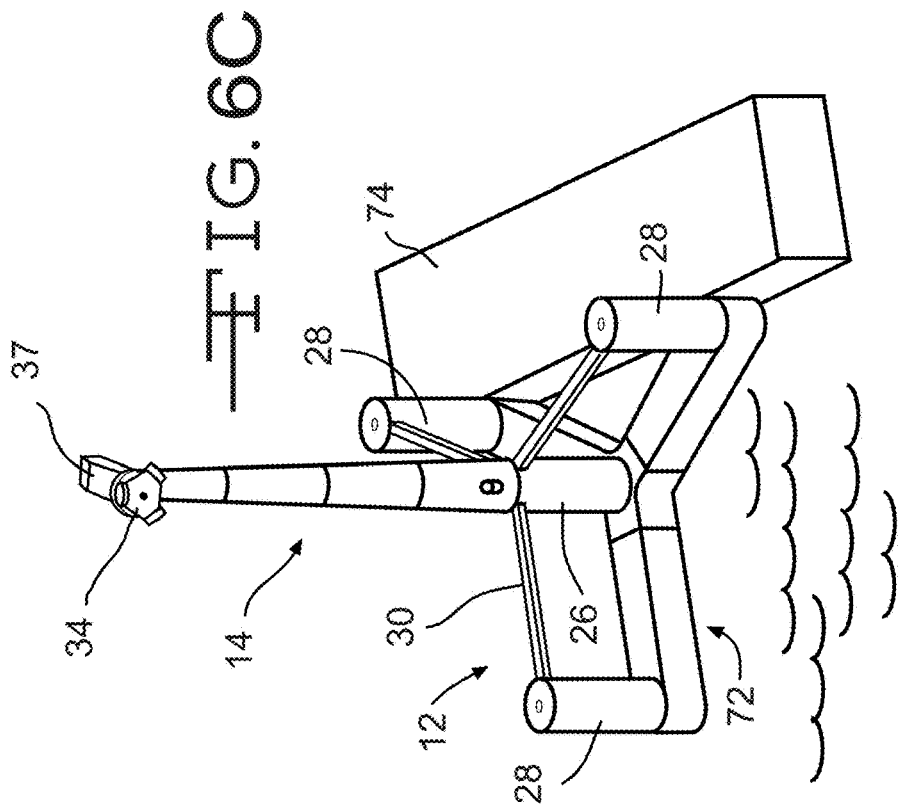
FIG. 6C is a perspective view of the foundation illustrated in FIG. 6B showing the hub assembled thereto.

Once the tower 14 is assembled, the nacelle 37 (as shown in FIG. 6B), the hub 34 (as shown in FIG. 6C), and the rotor blades 36 (as shown in FIG. 6D) may be assembled and installed on the tower 14, such as with a crane (not shown).

The completed floating wind turbine platform 10; i.e., the foundation 12 with the assembled tower 14 and wind turbine 16, may then be towed to a desired location, such as to a temporary holding area, or to a wind turbine farm where the wind turbine platform 10 will be placed into operation. In the temporary holding area, the wind turbine platform 10 may be temporarily moored by any conventional mooring method. In the wind turbine farm where it will be placed into operation, the wind turbine platform 10 may be moored by any of the mooring methods described below.

While being towed, or upon arriving at its temporary or permanent location, ballast water may be pumped into ballast chambers (such as the ballast chambers 23 shown in FIG. 4B) that may be formed in one or more of the keystone 24 and each bottom beam 22. Ballast water, or other forms of ballast, may be added to the foundation 12 to move the floating wind turbine platform 10 to a desired operating draft.

A second embodiment (not shown) of the method of assembling a floating wind turbine platform 10 is substantially the same as the first embodiment of the method, and includes forming and/or assembling the keystone 24 and the bottom beams 22 in the graving dock 70. In the second embodiment of the method of assembling a floating wind turbine platform 10, the graving dock 70 is a deep graving dock. As used herein, a deep graving dock is a graving dock built in water having a depth of about 30 feet, or having any depth deeper than the minimum draft required to float the completed floating wind turbine platform 10. The remaining steps of the method of assembling the floating wind turbine platform 10 according to the second embodiment of the method are the same as described and illustrated in the first embodiment of the method.

A third embodiment of a method of assembling the floating wind turbine platform 10 is shown in FIGS. 4A through 4C, 7A through 7C, and 6A through 6D. As will be described in detail, the third embodiment of the method includes forming or assembling the entire foundation 12 in the deep graving dock 70, described above, and further forming or assembling the tower 14 and wind turbine 16 on the assembled foundation 12 in the deep graving dock 70.

The first step of the third embodiment of the method is the same as illustrated in FIGS. 4A through 4C and described above.

Once the keystone 24 and the bottom beams 22 are assembled and post-tensioned, the graving dock 70 is not flooded. Rather, the center column 26 and the outer columns 28 are formed within the graving dock 70, as shown in FIGS. 7A through 7C. As described in detail above, the center column 26 and the outer columns 28 may be formed by any conventional reinforced concrete forming method, such a by slip forming, or by jump forming. Once formed, the center column 26 and the outer columns 28 may then be post-tensioned as described above.

Alternatively, the center column 26 and the outer columns 28 may be formed in sections 27 and 29, respectively, as shown in FIG. 7A, from reinforced concrete in a manufacturing step outside the graving dock 70 and moved to the graving dock 70. Once moved within the graving dock 70, the sections 29 of the center column 26 and the outer columns 28 may be assembled, such as with a crane (not shown) and post-tensioned as described above.

Further, as shown in FIG. 7C, after completion and post-tensioning of the center column 26 and the outer columns 28, the top members 30 may be attached between upper ends of the center column 26 and each outer column 28, as described above.

The tower 14 may be formed and the wind turbine 16 installed on the tower 14, as shown in FIGS. 6A through 6D and described above, but within the graving dock 70. Once the tower 14 is assembled, the nacelle 37 (as shown in FIG. 6B), the hub 34 (as shown in FIG. 6C), and the rotor blades 36 (as shown in FIG. 6D) may be assembled and installed on the tower 14, such as with a crane (not shown).

The graving dock 70 may then be flooded and the completed floating wind turbine platform 10 then floated and towed to a desired location, as described above.

A fourth embodiment of a method of assembling the floating wind turbine platform 10 is shown in FIGS. 8A through 8E. As will be described in detail, the fourth embodiment of the method includes forming or pre-casting modules or sections of the keystone 24, the bottom beams 22, the center column 26, and the outer columns 28, then assembling them in the deep graving dock 70. Subsequently, the tower 14 and wind turbine 16 are formed or assembled on the assembled foundation 12 in the deep graving dock 70 by any of the methods described above.

In a first step of the fourth embodiment of the method, as best shown in FIGS. 8A through 8E, the deep graving dock 70 is formed.

Figure 8A:
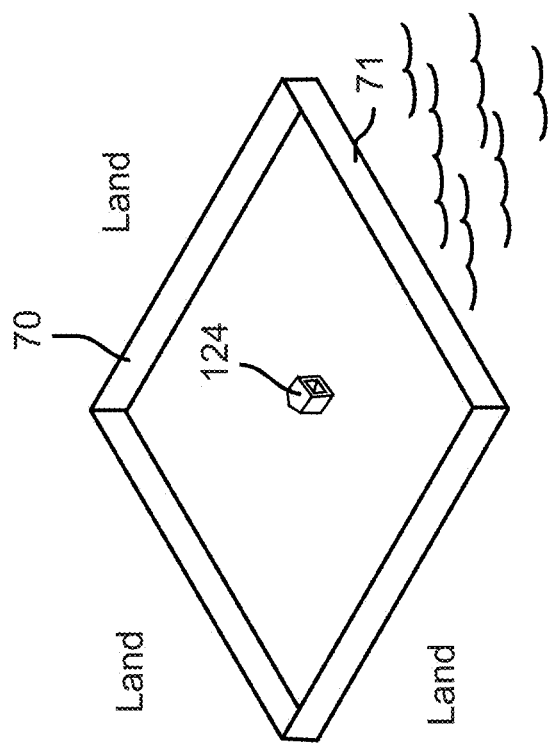
FIG. 8A is a perspective view of a graving dock shown during a first step of a third embodiment of the improved method of assembling a floating wind turbine platform.
Figure 8B:
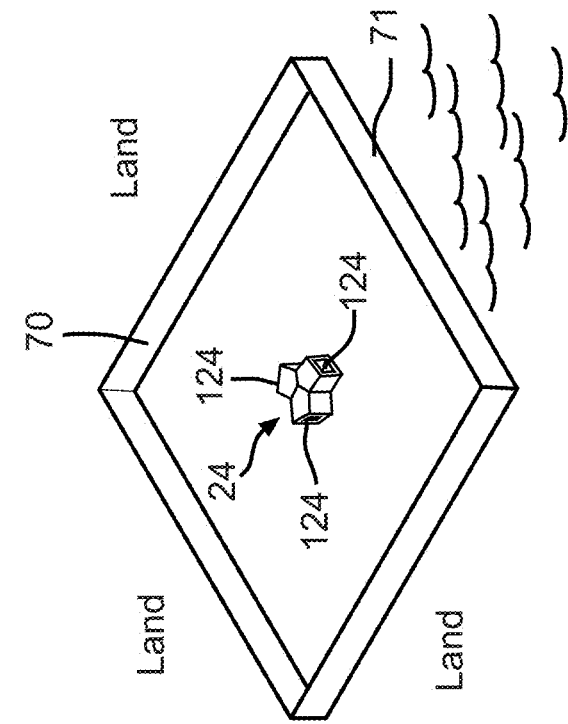
FIG. 8B is a perspective view of the graving dock illustrated in FIG. 8A showing a second step of the third embodiment of the improved method of assembling a floating wind turbine platform.
Figure 8C:
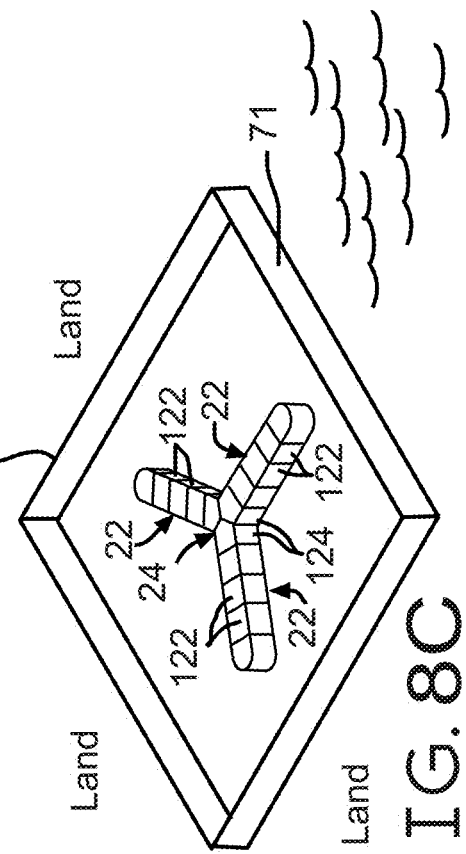
FIG. 8C is a perspective view of the graving dock illustrated in FIGS. 8A and 8B showing the base assembly formed during a third step of the third embodiment of the improved method of assembling a floating wind turbine platform.

Sections 124 defining legs of the keystone 24 are then moved to an interior of the graving dock 70 as best shown in FIGS. 8A and 8B. Sections 122 defining portions of the bottom beams 22 are then moved to an interior of the graving dock 70 as best shown in FIG. 8C. Once the sections 124 of the keystone 24 and the sections 122 of the bottom beams 22 are positioned within the graving dock 70, the keystone 24 and each bottom beam 22 may be post-tensioned along the longitudinal axes of each bottom beam 22 to define the base assembly 72, as described above. If desired, adhesive may be applied between the sections 122 of the bottom beams 22 and between the sections 124 of the keystone 24 before the bottom beams 22 and the keystone 24 are post-tensioned together.

Although the keystone is illustrated as being assembled prior to the bottom beams 22, it will be understood that the base assembly 72 may be assembled in any desired order, including assembling the bottom beams 22 before assembling the keystone 24. Also, the keystone 24 and the bottom beams 22 may be formed in any desired number of sections 124 and 122, respectively, such as four sections, three sections, two sections, or even one section. The keystone 24 and the bottom beams 22 may also be formed in more than four sections.

Figures 8D, 8E:
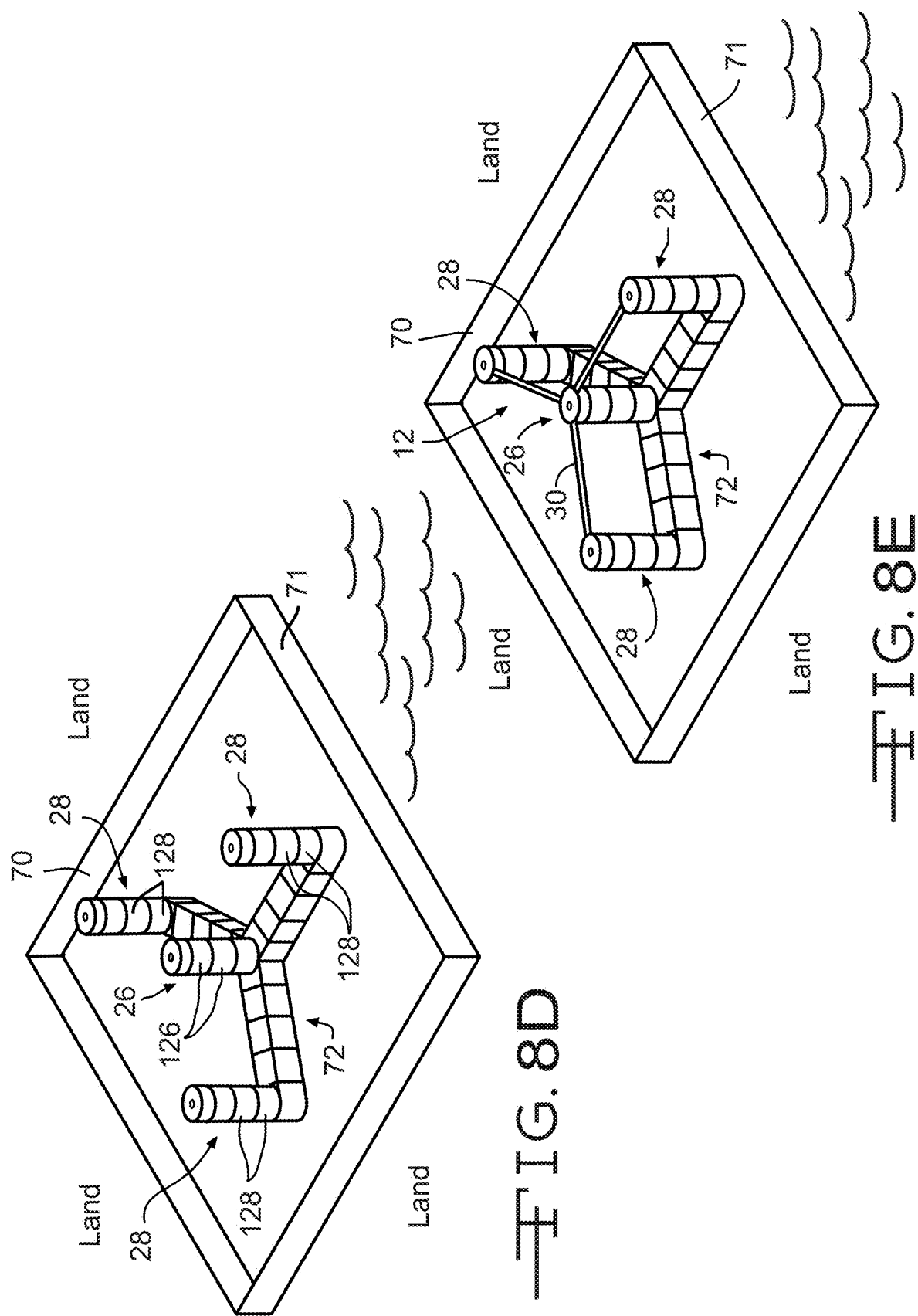
FIG. 8D is a perspective view of the base assembly illustrated in FIG. 8C showing the center and the outer columns fully formed.
FIG. 8E is a perspective view of the base assembly illustrated in FIG. 8D showing the top members installed and defining the foundation of the floating wind turbine platform.

Sections 126 and 128 defining portions of the center column 26 and the outer columns 28, respectively, are then moved to an interior of the graving dock 70 and assembled onto the bottom beams 22, as best shown in FIG. 8D. Once the sections 126 and 128 are positioned onto the bottom beams 22, they may be post-tensioned longitudinally, as described above. The top members 30 are then connected to the center column 26 and each of the outer columns 28 to define the foundation 12, as described above and shown in FIG. 8E. The center column 26 and the outer columns 28 may be assembled in any desired order. Also, the center column 26 and the outer columns 28 may be formed in any desired number of sections 126 and 128, respectively, such as four sections, three sections, two sections, or even one section. The center column 26 and the outer columns 28 may also be formed in more than four sections.

Once the foundation 12 is complete, the tower sections 14c may be assembled and the wind turbine 16; i.e., the nacelle 37, the hub 34, and the rotor blades 36, are installed on the tower 14 to define the floating wind turbine platform 10, as shown in FIGS. 6A through 6D and described above, but within the graving dock 70. It will be understood that each of the sections 122, 124, 126, 128, the top members 30, the tower sections 14c, the nacelle 37, the hub 34, and the rotor blades 36 may be moved and installed within the graving dock 70 by any desired means, such as with a crane (not shown).

The graving dock 70 may then be flooded and the completed floating wind turbine platform 10 then floated and towed to a desired location, as described above.

A fifth embodiment of a method of assembling the floating wind turbine platform 10 is shown in FIGS. 9A through 9C. As shown, one or more of the base assemblies 72 may be formed in an assembly area 80 near a body of water. In the illustrated embodiment, the assembly area 80 includes a ramp R extending into the body of water. In this embodiment a graving dock is not required. For example, the base assembly 72 may be assembled from pre-cast sections, such as the sections 122 and 124 described above. Once the sections 124 of the keystone 24 and the sections 122 of the bottom beams 22 are assembled, they may be post-tensioned longitudinally to define the base assembly 72, as described above. Alternatively, the keystone 24 and the bottom beams 22 may be cast in place.

Once the base assembly 72 is assembled, it may be slid down the ramp R and into the water, where it may be floated to a dock 74, as shown in FIGS. 5A-5C and 6A-6D. At the dock 74, the center column 26 and the outer columns 28 may be formed. The base assembly 72 may be slid down the ramp R using any conventional methods and structures, such as those methods and structures used in the ship building industry. The center column 26 and the outer columns 28 may be formed by any conventional reinforced concrete forming method, such a by slip forming or by jump forming. Alternatively, the center column 26 and the outer columns 28 may be assembled from pre-cast sections 126 and 128 as described above. The top members 30 may then be attached between upper ends of the center column 26 and each outer column 28. As shown in FIGS. 6A through 6D, the tower 14 may be formed and the wind turbine 16 installed on the tower 14. The tower 14 may be formed from sections 14c from any desired material as described above. The sections 14c of the tower 14 and the components of the wind turbine 16 may be assembled as described above.

Figure 10:
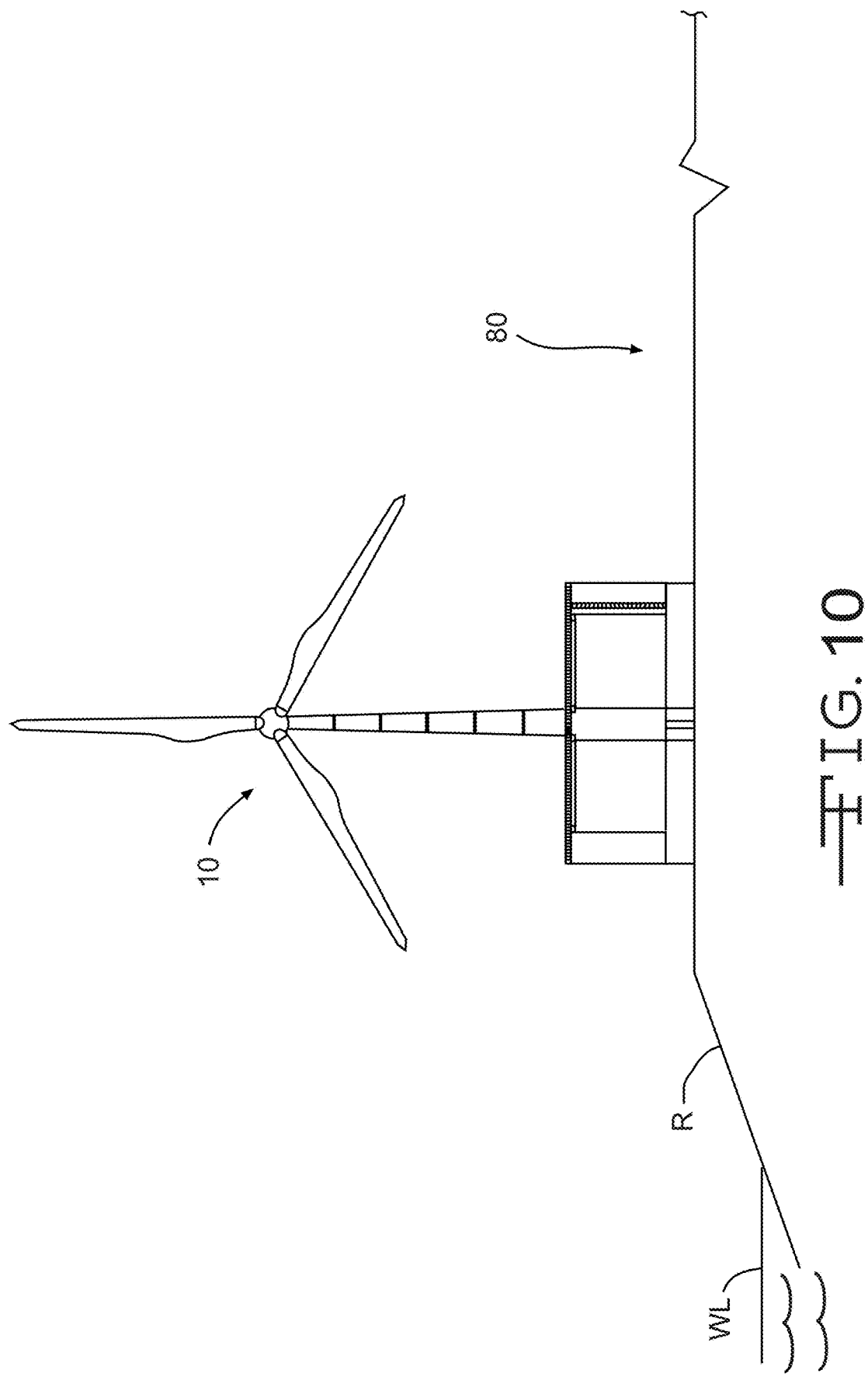
FIG. 10 is an elevational view of the floating wind turbine platform shown assembled in an assembly area in accordance with a sixth embodiment of the improved method of assembling a floating wind turbine platform.

A sixth embodiment of a method of assembling the floating wind turbine platform 10 is shown in FIG. 10. As shown, the entire floating wind turbine platform 10 may be formed in the assembly area 80 near a body of water. It will be understood that the assembly area 80 may be sufficiently large enough so that more than one floating wind turbine platform 10 may be concurrently formed therein. The floating wind turbine platform 10 may be formed by any of the methods described herein, or combinations thereof.

Once the floating wind turbine platform 10 is assembled, it may be slid down the ramp R and into the water, where it may be floated and towed to a desired location, such as to a temporary holding area, or to a wind turbine farm where the wind turbine platform 10 will be placed into operation. Like the base assembly 72 described above, the assembled floating wind turbine platform 10 may be slid down the ramp R using any conventional methods and structures, such as those methods and structures used in the ship building industry.

As shown in FIG. 1, mooring lines 18 may be attached to the floating wind turbine platform 10 and further attached to anchors, such as the anchors 20 in the seabed S to limit to movement of the floating wind turbine platform 10 on the body of water. The floating wind turbine platform 10 may attached to the seabed S by three or more mooring lines attached to each of the outer columns 28 below the waterline WL.

Referring now to FIGS. 11-12D, various embodiments of methods of mooring the floating wind turbine platform 10 are shown. In a first embodiment of a method of mooring, as shown in FIG. 11, mooring lines, schematically illustrated at 200 are formed from synthetic rope, such as nylon or polyester rope. Alternatively, at least a portion of the mooring lines 200 are formed from synthetic rope. Additionally, the mooring lines 200 may be formed from other materials such as polypropylene, polyethylene (including ultra high molecular weight polyethylene), and aramid materials. The mooring lines 200 illustrated in FIG. 11 are taut mooring lines wherein the mooring lines 200 are connected to the seabed S and to the floating wind turbine platform 10, then pre-tensioned or pulled until they are taut and then secured to remain taut. The mooring lines 200 may be pre-tensioned by any desired means, such as a winch.

Referring again to FIG. 11, the floating wind turbine platform 10 is shown moored by taut synthetic mooring lines 200 in water having a depth D of about 400 m (1312 ft). The mooring lines 200 are attached to the anchors 20 at a distance H of between about 260-290 m (850-950 ft), measured horizontally from a vertical line CL that runs through a center of the floating wind turbine platform 10.

The material and length of the mooring lines and the horizontal distance of the anchors from the centerline CL of the floating wind turbine platform 10 may be determined by the depth of the water, the anticipated load, the wave conditions, the contour of the seabed, and other environmental factors.

For example, in water having a depth D of about 150 m (492 ft), the mooring lines 200 may be attached to the anchors 20 at a horizontal distance H of between about 167-198 m (550-650 ft) from the vertical line CL. In water having a depth D of about 105 m (344 ft), the mooring lines 200 may be attached to the anchors 20 at a horizontal distance H of between about 213-243 m (700-800 ft) from the vertical line CL. In water having a depth D of about 60 m (196 ft), the mooring lines 200 may be attached to the anchors 20 at a horizontal distance H of between about 198-228 m (650-750 ft) from the vertical line CL. And in water having a depth D of about 30 m (98 ft), the mooring lines 200 may be attached to the anchors 20 at a horizontal distance H of between about 137-167 m (450-550 ft) from the vertical line CL.

Preferably, the taut synthetic mooring lines 200 may be arranged such that a ratio of the horizontal distance H to the depth D of the water is within the range of about 1:1 to about 15:1.

In a second embodiment of the method of mooring, catenary mooring lines (schematically illustrated at 200) may be formed from chain, such as steel chain, connected to the seabed S and to the floating wind turbine platform 10.

In a third embodiment of the method of mooring, the mooring lines (schematically illustrated at 200) may be formed from one or more segments of chain connected to one or more segments of wire rope and attached to the seabed S and to the floating wind turbine platform 10.

In a fourth embodiment of the method of mooring, the mooring lines (schematically illustrated at 200) may be formed from one or more segments of chain connected to one or more segments of the synthetic rope described above, and attached to the seabed S and to the floating wind turbine platform 10.

In a fifth embodiment of the method of mooring, the mooring lines (schematically illustrated at 200) may be formed from one or more segments of chain connected to one or more segments of the synthetic rope described above, and to one or more segments of wire rope, and attached to the seabed S and to the floating wind turbine platform 10. The segments of chain, synthetic rope, and wire rope may be attached in any desired order by any conventional means of attachment.

In a sixth embodiment of the method of mooring, the mooring lines (schematically illustrated at 200) may be formed from one segment of the synthetic rope described above, positioned between two chain sections.

In a seventh embodiment of the method of mooring, the mooring lines (schematically illustrated at 200) may be formed from one segment of the synthetic rope described above, positioned between two chain sections, with a lifting buoyancy device (not shown) positioned near a lower end of the synthetic rope.

Any type of anchor 20 may be used to attach the mooring lines to the seabed S, such as any of the four types of anchors shown in FIGS. 12A-12D. For example, a drilled anchor 202 is shown in FIG. 12A. This type of anchor is typically used to anchor a taut mooring line 200, and is typically used in rocky material (schematically represented by the ovals 201) or in locations where rock underlies a granular or cohesive material, such as a mixture of clay particles, silt, sand, organic material, and water. Once the drilled anchor 202 is drilled into the seabed S, grout G is positioned around the drilled anchor 202. Any suitable conventional grout G may be used. In the illustrated embodiment, the mooring line 200 is attached to the exposed distal end (upper end when viewing FIG. 12A) of the drilled anchor 202 by a connecting member (not shown).

A first driven anchor 204 is shown in FIG. 12B. This type of anchor is also typically used to anchor a taut mooring line 200, but is typically used in locations where the seabed S consists of granular or cohesive material. In the illustrated embodiment, the mooring line 200 is attached to the exposed distal end (upper end when viewing FIG. 12B) of the driven anchor 204 by a connecting member (not shown).

A second driven anchor 206 is shown in FIG. 12C. This type of anchor is typically used to anchor a catenary mooring line 212, and is typically used in locations where the seabed S consists of granular or cohesive material. A mooring line connecting member 210 is located on the driven anchor 206 intermediate the distal ends thereof. As shown in FIG. 12C, the mooring line connecting member 210 is further positioned underground, below the surface of the seabed S.

A gravity base anchor 208 is shown in FIG. 12D. This type of anchor is also typically used to anchor a catenary mooring line 212. The gravity base anchor 208 may be deployed on all soil types, and is particularly well suited for use in locations where the seabed S consists of granular or cohesive material. In the illustrated embodiment, the mooring line 200 is attached to a lower portion of the gravity base anchor 208, as close to the seabed S as possible.

Figure 13:
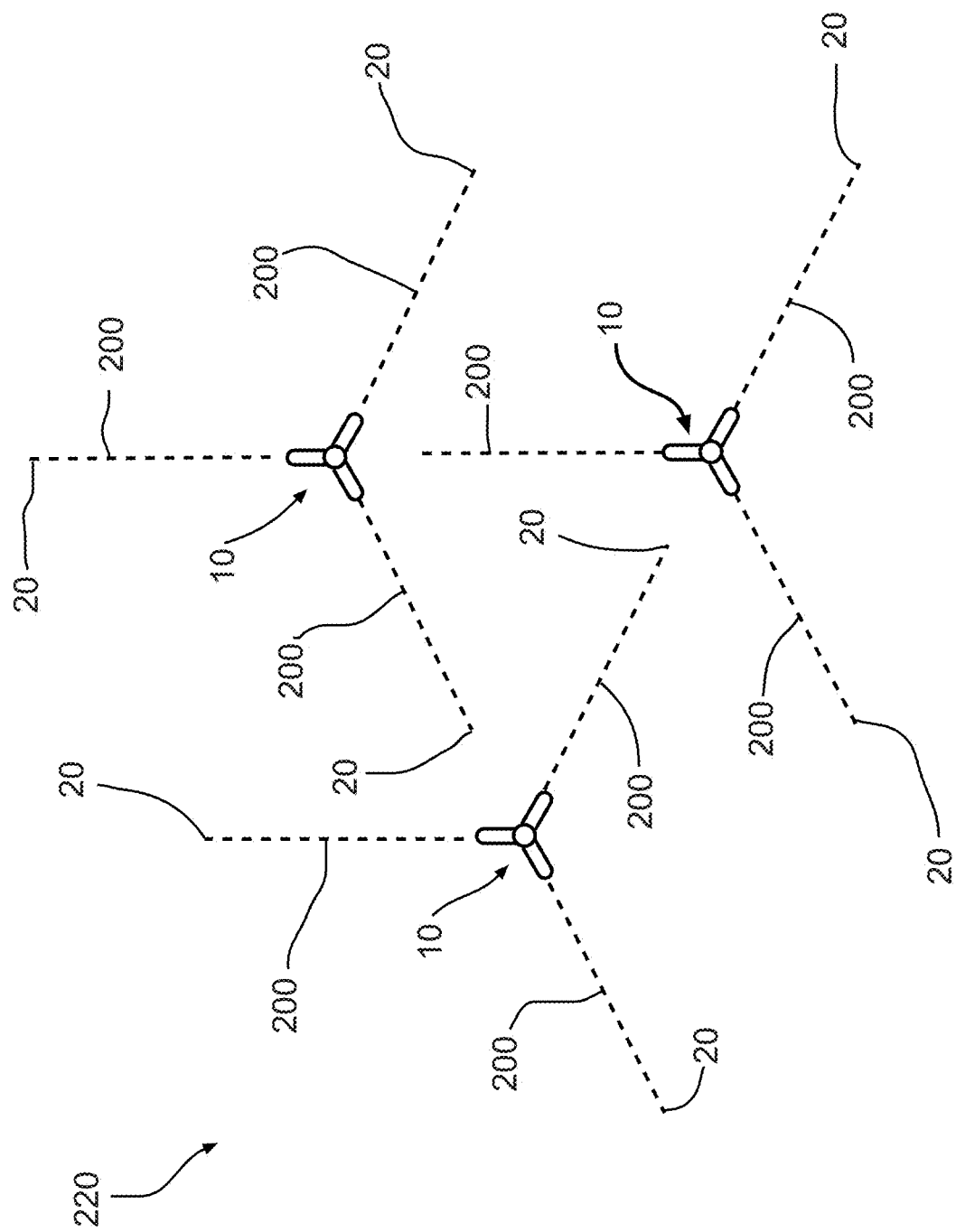
FIG. 13 is a plan view of a body of water showing a first embodiment of a wind turbine farm.

In a first embodiment of a wind turbine farm 220, as shown in FIG. 13, a plurality of floating wind turbine platforms 10 may be moored in close proximity to one another. Each mooring line 200 may be attached to a discrete anchor 20. In the illustrated embodiment each mooring line 200 is co-linearly aligned with a mooring line 200 of an adjacent floating wind turbine platform 10. Alternatively, the adjacent floating wind turbine platforms 10 may be positioned any suitable distance apart. The distance in which the adjacent floating wind turbine platforms 10 may be spaced may be determined by the size of the tower 14 and the wind turbine 16, and the depth of the water, the anticipated load, the wave conditions, the contour of the seabed, and other environmental factors.

Figure 14:
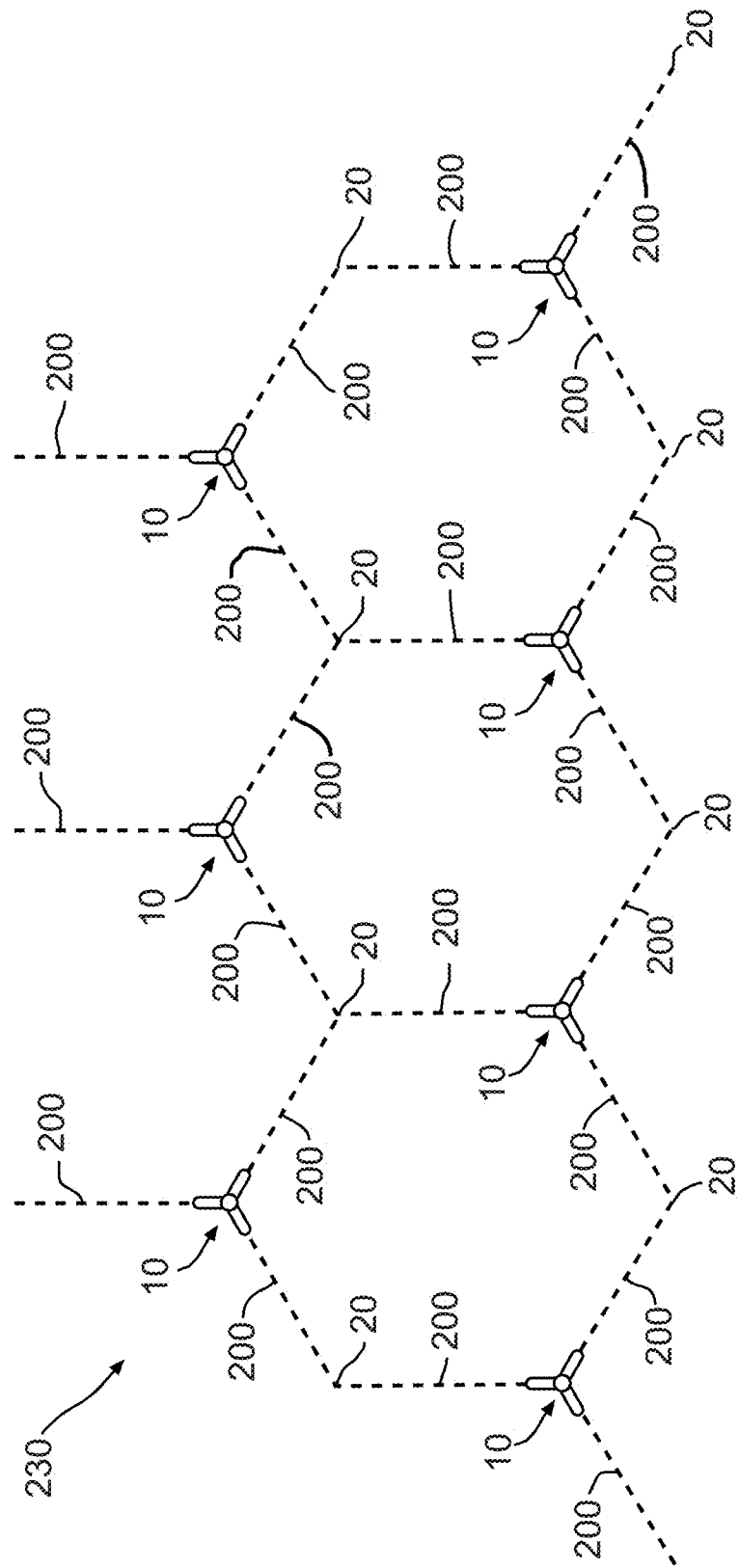
FIG. 14 is a plan view of a body of water showing a second embodiment of a wind turbine farm.

In a second embodiment of a wind turbine farm 230, as shown in FIG. 14, a plurality of floating wind turbine platforms 10 may be moored in a hexagonal configuration wherein distal ends of the mooring lines 200 from two or three different floating wind turbine platforms 10 may be attached to the seabed (not shown in FIG. 14) at the same location. Although attached to the seabed at one location, the two or three mooring lines 200 may be attached to one common anchor 20, or may be attached to two or three separate, but co-located anchors 20. Alternatively, the plurality of floating wind turbine platforms 10 may be moored in configurations having other polygonal shapes wherein distal ends of the mooring lines 200 from two or more different floating wind turbine platforms 10 may be attached to the seabed at the same location. Such other polygonal shapes may be determined by the environment in which the plurality of floating wind turbine platforms 10 is moored, such as the depth of the water, the anticipated load, the wave conditions, the contour of the seabed, and other environmental factors.

The floating wind turbine platforms 10 illustrated in FIGS. 13 and 14 are shown moored with one or more floating wind turbine platforms 10 to define various embodiments of a wind turbine farm. It will be understood however, that a single floating wind turbine platform 10 may be moored, by one of the methods disclosed herein, individually and at any desired location in a body of water.

The principle and mode of operation of the invention have been described in its preferred embodiments. However, it should be noted that the invention described herein may be practiced otherwise than as specifically illustrated and described without departing from its scope.

What is claimed is:

1. A floating wind turbine farm comprising:
    a plurality of anchors fixed in or on a bed of a body of water; and
    a plurality of floating wind turbine platforms, each floating wind turbine platform having a buoyant base assembly and a wind turbine tower mounted centrally thereon, the buoyant base assembly including a keystone, three buoyant bottom beams extending radially outward of the keystone and perpendicularly to a longitudinal axis of the wind turbine tower, and a buoyant outer column mounted to a distal end of each of the three buoyant bottom beams, each outer column extending perpendicularly to the three buoyant bottom beams, the plurality of floating wind turbine platforms deployed in the body of water, a mooring line extending between and attached to a distal portion of each of the three buoyant bottom beams and one of the plurality of anchors;
    wherein each anchor is configured to receive two or more mooring lines, each of the two or more mooring lines from a different one of the plurality of floating wind turbine platforms;
    wherein each of a first and a second mooring line of the two or more mooring lines of each of three of the plurality of floating wind turbine platforms intersects with one of a first and a second mooring line of an adjacent one of the three of the plurality of floating wind turbine platforms at one of three anchors, the three anchors and a center of each of the three of the plurality of floating wind turbine platforms defining vertices of a regular hexagon;
    wherein each of the three anchors is additionally connected to a third mooring line from a floating wind turbine platform outside an outer perimeter of the regular hexagon; and
    wherein each of the three anchors is directly connected at most to each of the first, the second, and the third mooring lines.

2. The floating wind turbine farm according to claim 1, wherein at least a portion of each mooring line is formed from synthetic rope.

3. The floating wind turbine farm according to claim 2, wherein the mooring lines are formed from at least one segment of chain connected to at least one segment of the synthetic rope.

4. The floating wind turbine farm according to claim 2, wherein the mooring lines are formed from at least one segment of chain connected to at least one segment of the synthetic rope, and connected to at least one segment of wire rope.

5. The floating wind turbine farm according to claim 2, wherein the synthetic rope is polyester rope.

6. The floating wind turbine farm according to claim 2, wherein the synthetic rope is one of nylon, polypropylene, polyethylene, and aramid rope.

7. The floating wind turbine farm according to claim 2, wherein each of the mooring lines is a taut mooring line.

8. A floating wind turbine farm comprising:
    a plurality of anchors fixed in or on a bed of a body of water;
    a plurality of floating wind turbine platforms deployed in the body of water, each floating wind turbine platform having one or more mooring lines extending between and attached to each floating wind turbine platform and one of the plurality of anchors;
    wherein each of the one or more mooring lines is a taut mooring line formed from synthetic rope; and
    wherein each of the one or more mooring lines is arranged such that a ratio (H:D) of a distance (H) measured horizontally from a vertical line that runs through a center of the floating wind turbine platform to a depth (D) of the body of water in which the floating wind turbine platform is moored is within the range of from 1:1 to 15:1.

9. The floating wind turbine farm according to claim 8, wherein the synthetic rope is polyester rope.

10. The floating wind turbine farm according to claim 8, wherein the synthetic rope is one of nylon, polypropylene, polyethylene, and aramid rope.

11. The floating wind turbine farm according to claim 8, wherein the mooring lines are formed from at least one segment of chain connected to at least one segment of the synthetic rope.

12. The floating wind turbine farm according to claim 8, wherein the mooring lines are formed from at least one segment of chain connected to at least one segment of the synthetic rope, and connected to at least one segment of wire rope.

13. A floating wind turbine platform comprising:
    a foundation configured for floating in a body of water the foundation including a base assembly having a keystone and a plurality of buoyant bottom beams extending radially outward of the keystone, wherein longitudinal axes of each of the plurality of buoyant bottom beams are coplanar;
    a tower mounted to the foundation;

a wind turbine mounted to the tower; and at least one mooring line extending between and attached to the foundation and an anchor attached to a bed of the body of water in which the floating wind turbine platform floats;

wherein the at least one mooring line is a taut mooring line formed from synthetic rope; and wherein the at least one mooring line is arranged such that a ratio (H:D) of a distance (H) measured horizontally from a vertical line that runs through a center of the floating wind turbine platform to a depth (D) of the body of water in which the floating wind turbine platform is moored is within the range of from 1:1 to 15:1.

14. The floating wind turbine platform according to claim 13, wherein the synthetic rope is one of polyester, nylon, polypropylene, polyethylene, and aramid rope.

15. The floating wind turbine platform according to claim 13, wherein the mooring line is formed from at least one segment of chain connected to at least one segment of the synthetic rope.

16. The floating wind turbine platform according to claim 13, wherein the mooring line is formed from at least one segment of chain connected to one at least one segment of the synthetic rope, and connected to at least one segment of wire rope.

17. The floating wind turbine platform according to claim 13, wherein the mooring line is formed from at least one segment of wire rope connected to at least one segment of the synthetic rope.

18. The floating wind turbine platform according to claim 13, wherein the mooring line is formed from one segment of the synthetic rope connected between two segments of chain.

19. A floating wind turbine farm comprising:

a plurality of anchors fixed in or on a bed of a body of water; and a plurality of floating wind turbine platforms, each floating wind turbine platform having a buoyant base assembly and a wind turbine tower mounted centrally thereon, the buoyant base assembly including at least three bottom beams extending radially outward from a center of the buoyant base assembly and perpendicularly to a longitudinal axis of the wind turbine tower, the plurality of floating wind turbine platforms deployed in the body of water, a mooring line extending between and attached to a distal portion of each of the at least three bottom beams and one of the plurality of anchors;

wherein each anchor is configured to receive two or more mooring lines, each of the two or more mooring lines from a different one of the plurality of floating wind turbine platforms;

wherein each of a first and a second mooring line of the two or more mooring lines of each of three of the plurality of floating wind turbine platforms intersects with one of a first and a second mooring line of an adjacent one of the three of the plurality of floating wind turbine platforms at one of three anchors, the three anchors and a center of each of the three of the plurality of floating wind turbine platforms defining vertices of a regular hexagon;

wherein each of the three anchors is additionally connected to a third mooring line from a floating wind turbine platform outside an outer perimeter of the regular hexagon;

wherein each of the three anchors is directly connected at most to each of the first, the second, and the third mooring lines, and wherein each mooring line is arranged such that a ratio (H:D) of a distance (H) measured horizontally from a vertical line that runs through a center of the floating wind turbine platform to a depth (D) of the body of water in which the floating wind turbine platform is moored is within the range of from 1:1 to 15:1.

* * * * *